United States Patent
Abraham et al.

(10) Patent No.: US 9,326,153 B2
(45) Date of Patent: Apr. 26, 2016

(54) NETWORK SETUP IN WIDE CHANNEL WIRELESS LOCAL AREA NETWORKS (WLANS)

(75) Inventors: Santosh Paul Abraham, San Diego, CA (US); Simone Merlin, San Diego, CA (US); Hemanth Sampath, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 201 days.

(21) Appl. No.: 13/176,648

(22) Filed: Jul. 5, 2011

(65) Prior Publication Data

US 2012/0176974 A1  Jul. 12, 2012

Related U.S. Application Data

(60) Provisional application No. 61/361,867, filed on Jul. 6, 2010.

(51) Int. Cl.
*H04W 4/00* (2009.01)
*H04W 16/14* (2009.01)
*H04W 16/02* (2009.01)

(52) U.S. Cl.
CPC .............. *H04W 16/14* (2013.01); *H04W 16/02* (2013.01)

(58) Field of Classification Search
CPC ............................... H04W 16/14; H04W 16/02
USPC .................. 370/329, 330, 341; 455/450–464, 455/509–525
See application file for complete search history.

(56) References Cited

U.S. PATENT DOCUMENTS 5,722,043 A * 2/1998 Rappaport et al. .......... 455/452.1
5,772,043 A * 6/1998 Saveliev ....................... 209/212
(Continued)

FOREIGN PATENT DOCUMENTS

CN    1462524 A    12/2003
EP    1931086 A2    6/2008
(Continued)

OTHER PUBLICATIONS

"IEEE Standard for Information technology—Telecommunications and information exchange between systems—Local and metropolitan area networks—Specific requirements Part 11: Wireless LAN Medium Access Control (MAC) and Physical Layer (PHY) Specifications Amendment 5: Enhancements for Higher Throughput", IEEE Standard, IEEE, Piscataway, NJ, USA, Oct. 29, 2009, pp. 1-536, XP017604244, ISBN: 978-0-7381-6046-7.
(Continued)

*Primary Examiner* — Mang Yeung
(74) *Attorney, Agent, or Firm* — Dang M. Vo

(57) ABSTRACT

Methods and apparatus for network setup in wide channel WLANs are provided. Techniques for co-existence of 20 MHz and 40 MHz networks (e.g., as defined by IEEE 802.11n) may be extended to 80 MHz and 160 MHz networks. For example, a primary channel of an existing network may be designated as the primary channel of a new network. Further, a primary channel of the existing network may not be used as a secondary channel in the new network. Intolerance operation between networks may include a first network releasing one or more channels in response to an intolerance indication received from a second network. Furthermore, in response to the intolerance indication from the second network, the first network may utilize one or more channels for communicating in the first network using a first set of access parameters. The access parameters may depend on the intolerance indication.

30 Claims, 16 Drawing Sheets

(56) References Cited

U.S. PATENT DOCUMENTS

| | | | |
|---|---|---|---|
| 7,903,607 | B2 | 3/2011 | Utsunomiya et al. |
| 8,738,019 | B2 | 5/2014 | Gorokhov et al. |
| 2006/0034210 | A1 | 2/2006 | Chu et al. |
| 2007/0060062 | A1* | 3/2007 | Wengerter et al. ............ 455/63.2 |
| 2008/0137627 | A1* | 6/2008 | Fischer et al. ................. 370/338 |
| 2009/0067403 | A1 | 3/2009 | Chan et al. |
| 2009/0168738 | A1* | 7/2009 | Trainin ......................... 370/342 |
| 2010/0267408 | A1* | 10/2010 | Lee ..................... H04W 52/243 455/509 |
| 2011/0116401 | A1 | 5/2011 | Banerjea et al. |
| 2011/0116488 | A1 | 5/2011 | Grandhi |
| 2012/0218983 | A1* | 8/2012 | Noh et al. ..................... 370/338 |

FOREIGN PATENT DOCUMENTS

| | | |
|---|---|---|
| JP | 2004247985 A | 9/2004 |
| KR | 20080053244 A | 6/2008 |
| WO | 02093831 A2 | 11/2002 |
| WO | 2007103990 | 9/2007 |

OTHER PUBLICATIONS

"IEEE Standard for Information technology—Telecommunications information exchange between systems—Local and metropolitan area networks—Specific requirements Part 11: Wireless LAN Medium Access Control (MAC) and Physical Layer (PHY) Specifications Amendment 5: Enhancements for Higher Throughput", IEEE Standard, IEEE, Piscataway, NJ, USA, Oct. 29, 2009, pp. 224-225, XP002661096, ISBN: 978-0-7381-6046-7 the whole document.

International Search Report and Written Opinion—PCT/US2011/043092—ISA/EPO—Nov. 30, 2011.

Lin, J.H., et al., "An efficient channel allocation scheme in cell overlapping systems", Consumer Communications and Networking Conference, 2005. CCNC. 2005 Second IEEE, IEEE, Piscataway, NJ, USA, Jan. 3, 2005, pp. 380-385, XP010787668, DOI: 10.1109/CCNC.2005.1405201 ISBN: 978-0-7803-8784-3 the whole document.

Novillo, F et al., "A channel allocation algorithm for OSA-enabled IEEE 802.11 WLANs", Wireless Communication Systems, 2009. ISWCS 2009. 6th International Symposium on, IEEE, Piscataway, NJ, USA, Sep. 7, 2009, pp. 468-472, XP031545209, ISBN: 978-1-4244-3584-5 the whole document.

R.Stacey: "IEEE P802.11 Wireless LANs—Specification Framework for TGac", May 18, 2010, pp. 1-10, XP002661097, IEEE 802.11 Retrieved from the Internet: URL:http://www.ieee802.org/11/Reports/tgac_update.htm—entry "May 2010" [retrieved on Oct. 12, 2011] the whole document.

Kim Y., et al., 160 MHz Phy Transmission, doc :IEEE 802.11-10/0378r1, IEEE, pp. 1-18, May 17, 2010.

Perahia E., et al., TGn SB0 Submission for Coex 20-40—other system comments, doc :IEEE 802.11-09/0224r0, IEEE, pp. 1-12, Feb. 3, 2009.

* cited by examiner

US 9,326,153 B2

NETWORK SETUP IN WIDE CHANNEL WIRELESS LOCAL AREA NETWORKS (WLANS)

CROSS-REFERENCE TO RELATED APPLICATIONS

This application claims benefit of U.S. Provisional Patent Application Ser. No. 61/361,867, filed Jul. 6, 2010, which is herein incorporated by reference.

BACKGROUND

1. Field

Certain aspects of the present disclosure generally relate to wireless communications and, more particularly, to techniques for network setup in wide channel Wireless Local Area Networks (WLANs).

2. Background

In order to address the issue of increasing bandwidth requirements demanded for wireless communications systems, different schemes are being developed to allow multiple user terminals to communicate with a single access point by sharing the channel resources while achieving high data throughputs. Multiple Input Multiple Output (MIMO) technology represents one such approach that has recently emerged as a popular technique for next generation communication systems. MIMO technology has been adopted in several emerging wireless communications standards such as the Institute of Electrical and Electronics Engineers (IEEE) 802.11 standard. The IEEE 802.11 denotes a set of Wireless Local Area Network (WLAN) air interface standards developed by the IEEE 802.11 committee for short-range communications (e.g., tens of meters to a few hundred meters).

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

In wireless networks with a single Access Point (AP) and multiple user stations (STAs), concurrent transmissions may occur on multiple channels toward different stations, both in the uplink and downlink direction. Many challenges are present in such systems.

SUMMARY

Certain aspects of the present disclosure provide a method for wireless communications. The method generally includes determining that a first primary channel of a first existing network overlaps with a second set of channels to be used in a new network, designating the first primary channel as a primary channel in the new network in response to the determination regarding the first primary channel, determining that a second primary channel of a second existing network overlaps with the second set of channels, and avoiding using the second primary channel as a secondary channel in the new network.

Certain aspects of the present disclosure provide an apparatus for wireless communications. The apparatus generally includes a first circuit configured to determine that a first primary channel of a first existing network overlaps with a second set of channels to be used in a new network, a second circuit configured to designate the first primary channel as a primary channel in the new network in response to the determination regarding the first primary channel, a third circuit configured to determine that a second primary channel of a second existing network overlaps with the second set of channels, and a fourth circuit configured to avoid using the second primary channel as a secondary channel in the new network.

Certain aspects of the present disclosure provide an apparatus for wireless communications. The apparatus generally includes means for determining that a first primary channel of a first existing network overlaps with a second set of channels to be used in a new network, means for designating the first primary channel as a primary channel in the new network in response to the determination regarding the first primary channel, means for determining that a second primary channel of a second existing network overlaps with the second set of channels, and means for avoiding using the second primary channel as a secondary channel in the new network.

Certain aspects of the present disclosure provide a computer-program product for wireless communications. The computer-program product generally includes a computer-readable medium having instructions executable to determine that a first primary channel of a first existing network overlaps with a second set of channels to be used in a new network, to designate the first primary channel as a primary channel in the new network in response to the determination regarding the first primary channel, to determine that a second primary channel of a second existing network overlaps with the second set of channels, and to avoid using the second primary channel as a secondary channel in the new network.

Certain aspects of the present disclosure provide an access point including at least one antenna, a first circuit configured to determine that a first primary channel of a first existing network overlaps with a second set of channels to be used in a new network, a second circuit configured to designate the first primary channel as a primary channel in the new network in response to the determination regarding the first primary channel, a third circuit configured to determine that a second primary channel of a second existing network overlaps with the second set of channels, and a fourth circuit configured to avoid using the second primary channel as a secondary channel in the new network.

Certain aspects of the present disclosure provide a method for wireless communications. The method generally includes utilizing a first set of channels for communicating in a first wireless network, receiving an intolerance indication from a second wireless network, releasing at least a portion of the first set of channels in response to the intolerance indication, and utilizing a remaining portion of the first set of channels for communicating in the first wireless network.

Certain aspects of the present disclosure provide an apparatus for wireless communications. The apparatus generally includes a first circuit configured to utilize a first set of channels for communicating in a first wireless network, a second circuit configured to receive an intolerance indication from a second wireless network, a third circuit configured to release at least a portion of the first set of channels in response to the intolerance indication, and a fourth circuit configured to utilize a remaining portion of the first set of channels for communicating in the first wireless network.

Certain aspects of the present disclosure provide an apparatus for wireless communications. The apparatus generally includes means for utilizing a first set of channels for communicating in a first wireless network, means for receiving an intolerance indication from a second wireless network, means for releasing at least a portion of the first set of channels in response to the intolerance indication, and means for utilizing a remaining portion of the first set of channels for communicating in the first wireless network.

Certain aspects of the present disclosure provide a computer-program product for wireless communications. The computer-program product generally includes a computer-readable medium having instructions executable to utilize a first set of channels for communicating in a first wireless network, to receive an intolerance indication from a second wireless network, to release at least a portion of the first set of channels in response to the intolerance indication, and to utilize a remaining portion of the first set of channels for communicating in the first wireless network.

Certain aspects of the present disclosure provide an access point. The access point generally includes at least one antenna, a first circuit configured to utilize a first set of channels for communicating in a first wireless network, a second circuit configured to receive, via the at least one antenna, an intolerance indication from a second wireless network, a third circuit configured to release at least a portion of the first set of channels in response to the intolerance indication, and a fourth circuit configured to utilize a remaining portion of the first set of channels for communicating in the first wireless network.

Certain aspects of the present disclosure provide a method for wireless communications. The method generally includes utilizing a first set of channels for communicating in a first wireless network, receiving an intolerance indication from a second wireless network, in response to the intolerance indication, utilizing one or more channels from the first set of channels for communicating in the first wireless network using a first set of access parameters depending on the intolerance indication, and utilizing a remaining subset of the first set of channels for communicating in the first wireless network using a second set of access parameters depending on the intolerance indication.

Certain aspects of the present disclosure provide an apparatus for wireless communications. The apparatus generally includes a first circuit configured to utilize a first set of channels for communicating in a first wireless network, a second circuit configured to receive an intolerance indication from a second wireless network, a third circuit configured to utilize one or more channels from the first set of channels for communicating in the first wireless network using a first set of access parameters depending on the intolerance indication, in response to the intolerance indication, and a fourth circuit configured to utilize a remaining subset of the first set of channels for communicating in the first wireless network using a second set of access parameters depending on the intolerance indication.

Certain aspects of the present disclosure provide an apparatus for wireless communications. The apparatus generally includes means for utilizing a first set of channels for communicating in a first wireless network, means for receiving an intolerance indication from a second wireless network, means for utilizing one or more channels from the first set of channels for communicating in the first wireless network using a first set of access parameters depending on the intolerance indication, in response to the intolerance indication and means for utilizing a remaining subset of the first set of channels for communicating in the first wireless network using a second set of access parameters depending on the intolerance indication.

Certain aspects of the present disclosure provide a computer-program product for wireless communications. The computer-program product generally includes a computer-readable medium having instructions executable to utilize a first set of channels for communicating in a first wireless network, to receive an intolerance indication from a second wireless network, to utilize one or more channels from the first set of channels for communicating in the first wireless network using a first set of access parameters depending on the intolerance indication, in response to the intolerance indication, and to utilize a remaining subset of the first set of channels for communicating in the first wireless network using a second set of access parameters depending on the intolerance indication.

Certain aspects of the present disclosure provide an access point. The access point generally includes at least one antenna, a first circuit configured to utilize a first set of channels for communicating in a first wireless network, a second circuit configured to receive (via the at least one antenna) an intolerance indication from a second wireless network, a third circuit configured to utilize one or more channels from the first set of channels for communicating in the first wireless network using a first set of access parameters depending on the intolerance indication, in response to the intolerance indication, and a fourth circuit configured to utilize a remaining subset of the first set of channels for communicating in the first wireless network using a second set of access parameters depending on the intolerance indication.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Figure 1:
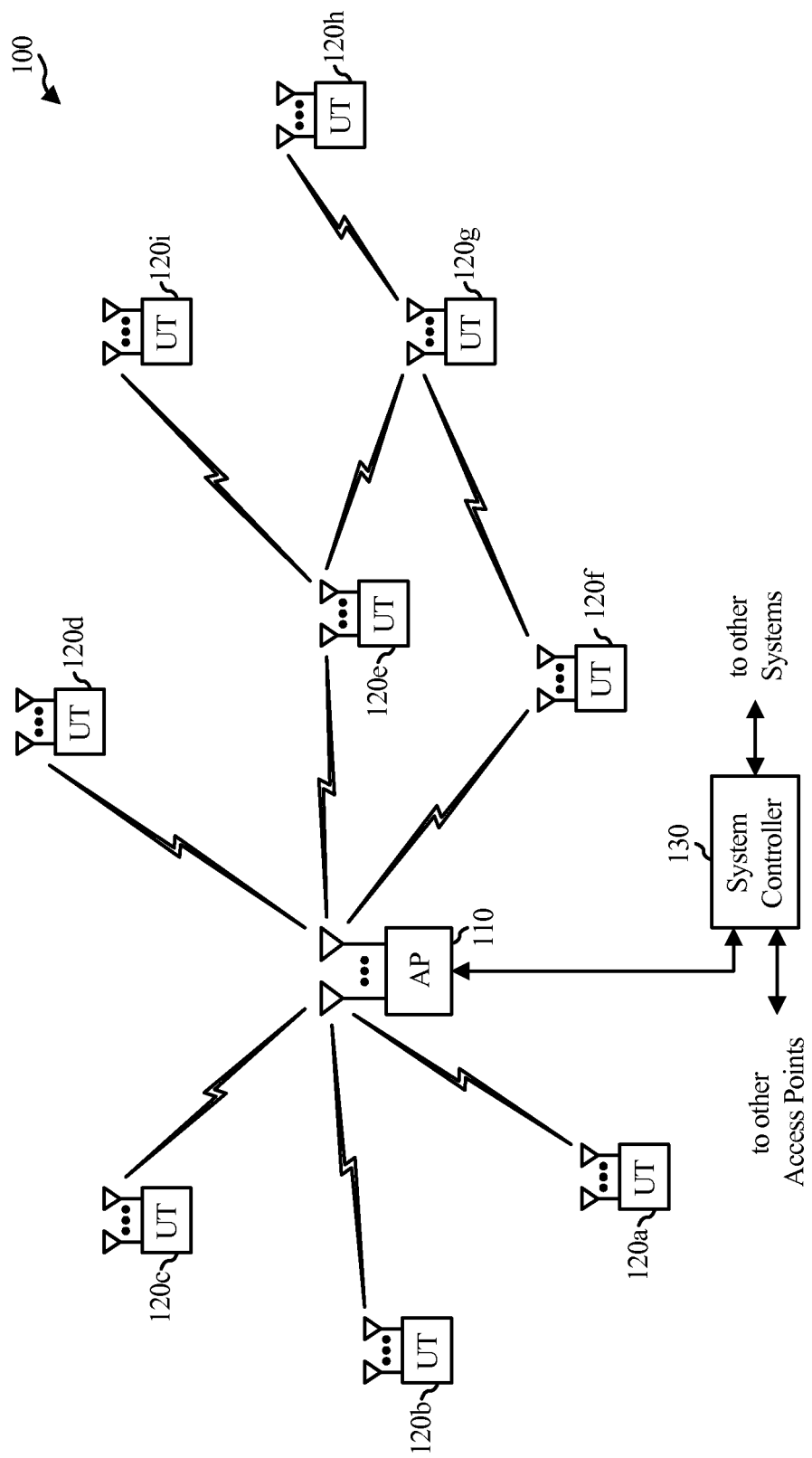
FIG. 1 illustrates a diagram of a wireless communications network in accordance with certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different wireless technologies, system configurations, networks and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems and so forth. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as Node B, Radio Network Controller ("RNC"), evolved Node B (eNB), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as an access terminal, a subscriber station, a subscriber unit, a mobile station, a remote station, a remote terminal, a user terminal, a user agent, a user device, user equipment, a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

FIG. 1 illustrates a multiple-access multiple-input multiple-output (MIMO) system 100 with access points and user terminals. For simplicity, only one access point 110 is shown in FIG. 1. An access point is generally a fixed station that communicates with the user terminals, and may also be referred to as a base station or some other terminology. A user terminal may be fixed or mobile and may also be referred to as a mobile station, a wireless device or some other terminology. Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

While portions of the following disclosure will describe user terminals 120 capable of communicating via Spatial Division Multiple Access (SDMA), for certain aspects, the user terminals 120 may also include some user terminals that do not support SDMA. Thus, for such aspects, an AP 110 may be configured to communicate with both SDMA and non-SDMA user terminals. This approach may conveniently allow older versions of user terminals ("legacy" stations) to remain deployed in an enterprise, extending their useful lifetime, while allowing newer SDMA user terminals to be introduced as deemed appropriate.

The system 100 employs multiple transmit and multiple receive antennas for data transmission on the downlink and uplink. The access point 110 is equipped with $N_{ap}$ antennas and represents the multiple-input (MI) for downlink transmissions and the multiple-output (MO) for uplink transmissions. A set of K selected user terminals 120 collectively represents the multiple-output for downlink transmissions and the multiple-input for uplink transmissions. For pure SDMA, it is desired to have $N_{ap} \geq K \geq 1$ if the data symbol streams for the K user terminals are not multiplexed in code, frequency or time by some means, K may be greater than $N_{ap}$ if the data symbol streams can be multiplexed using TDMA technique, different code channels with CDMA, disjoint sets of subbands with OFDM, and so on. Each selected user terminal transmits user-specific data to and/or receives user-specific data from the access point. In general, each selected user terminal may be equipped with one or multiple antennas (i.e., $N_{ut} \geq 1$). The K selected user terminals can have the same or different number of antennas.

The system 100 may be a time division duplex (TDD) system or a frequency division duplex (FDD) system. For a TDD system, the downlink and uplink share the same frequency band. For an FDD system, the downlink and uplink use different frequency bands. The MIMO system 100 may also utilize a single carrier or multiple carriers for transmission. Each user terminal may be equipped with a single antenna (e.g., in order to keep costs down) or multiple antennas (e.g., where the additional cost can be supported). The system 100 may also be a TDMA system if the user terminals 120 share the same frequency channel by dividing transmission/reception into different time slots, each time slot being assigned to different user terminal 120.

Figure 2:
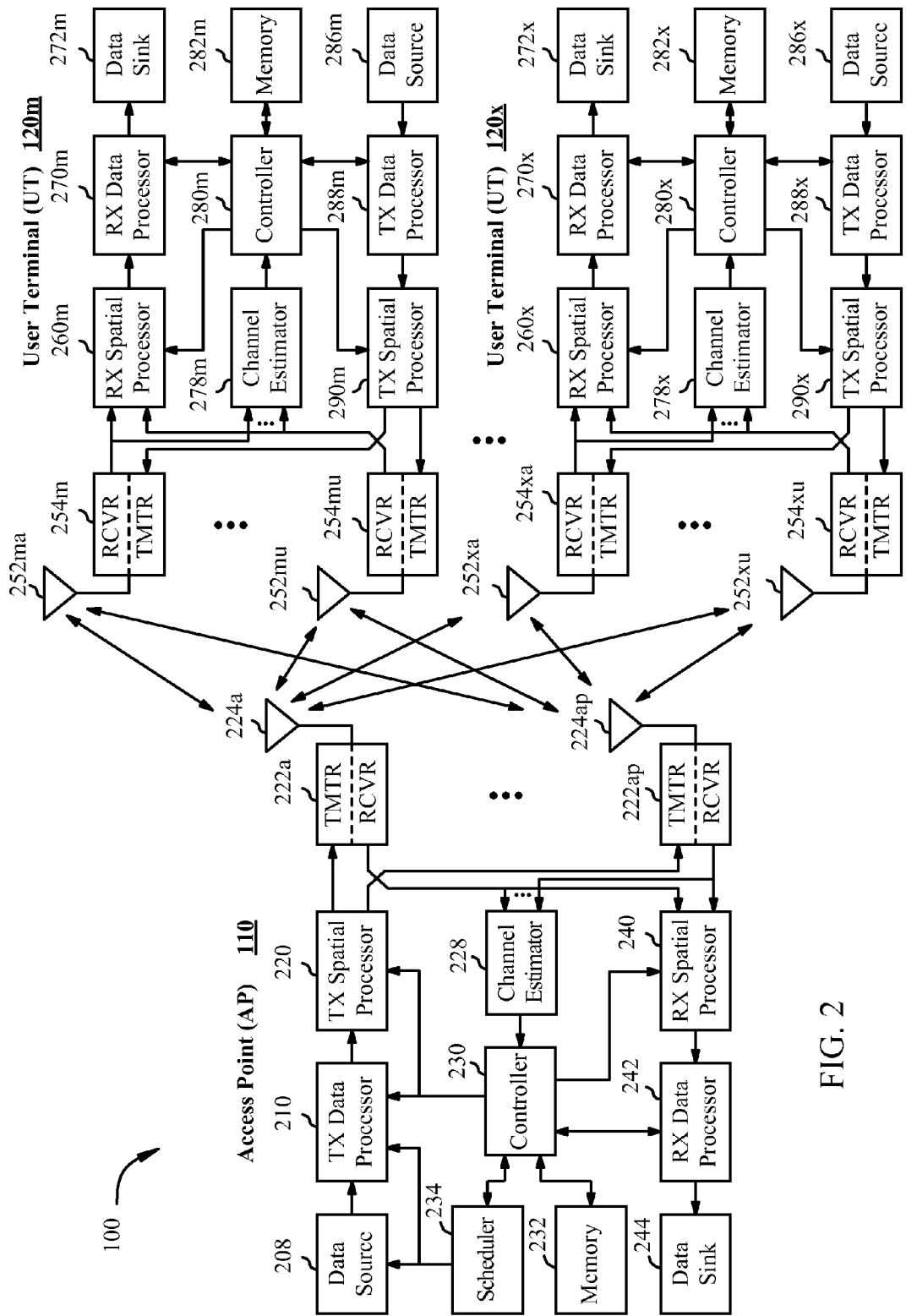
FIG. 2 illustrates a block diagram of an example access point and user terminals in accordance with certain aspects of the present disclosure.

FIG. 2 illustrates a block diagram of access point 110 and two user terminals 120m and 120x in MIMO system 100. The access point 110 is equipped with $N_t$ antennas 224a through 224t. User terminal 120m is equipped with $N_{ut,m}$ antennas 252ma through 252mu, and user terminal 120x is equipped with $N_{ut,x}$ antennas 252xa through 252xu. The access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, $N_{up}$ user terminals are selected for simultaneous transmission on the uplink, $N_{dn}$ user terminals are selected for simultaneous transmission on the downlink, $N_{up}$ may or may not be equal to $N_{dn}$, and $N_{up}$ and $N_{dn}$ may be static values or can change for each scheduling interval. The beam-steering or some other spatial processing technique may be used at the access point and user terminal.

On the uplink, at each user terminal 120 selected for uplink transmission, a TX data processor 288 receives traffic data from a data source 286 and control data from a controller 280. TX data processor 288 processes (e.g., encodes, interleaves, and modulates) the traffic data for the user terminal based on the coding and modulation schemes associated with the rate selected for the user terminal and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point.

$N_{up}$ user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224a through 224ap receive the uplink signals from all $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides $N_{up}$ recovered uplink data symbol streams. The receiver spatial processing is performed in accordance with the channel correlation matrix inversion (CCMI), minimum mean square error (MMSE), soft interference cancellation (SIC) or some other technique. Each recovered uplink data symbol stream is an estimate of a data symbol stream transmitted by a respective user terminal. An RX data processor 242 processes (e.g., demodulates, deinterleaves, and decodes) each recovered uplink data symbol stream in accordance with the rate used for that stream to obtain decoded data. The decoded data for each user terminal may be provided to a data sink 244 for storage and/or a controller 230 for further processing.

On the downlink, at access point 110, a TX data processor 210 receives traffic data from a data source 208 for $N_{dn}$ user terminals scheduled for downlink transmission, control data from a controller 230 and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 provides $N_{dn}$ downlink data symbol streams for the $N_{dn}$ user terminals. A TX spatial processor 220 performs spatial processing (such as a precoding or beamforming, as described in the present disclosure) on the $N_{dn}$ downlink data symbol streams, and provides $N_{ap}$ transmit symbol streams for the $N_{ap}$ antennas. Each transmitter unit 222 receives and processes a respective transmit symbol stream to generate a downlink signal. $N_{ap}$ transmitter units 222 providing $N_{ap}$ downlink signals for transmission from $N_{ap}$ antennas 224 to the user terminals.

At each user terminal 120, $N_{ut,m}$ antennas 252 receive the $N_{ap}$ downlink signals from access point 110. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the user terminal. The receiver spatial processing is performed in accordance with the CCMI, MMSE or some other technique. An RX data processor 270 processes (e.g., demodulates, deinterleaves and decodes) the recovered downlink data symbol stream to obtain decoded data for the user terminal.

At each user terminal 120, a channel estimator 278 estimates the downlink channel response and provides downlink channel estimates, which may include channel gain estimates, SNR estimates, noise variance and so on. Similarly, a channel estimator 228 estimates the uplink channel response and provides uplink channel estimates. Controller 280 for each user terminal typically derives the spatial filter matrix for the user terminal based on the downlink channel response matrix $H_{dn,m}$ for that user terminal. Controller 230 derives the spatial filter matrix for the access point based on the effective uplink channel response matrix $H_{up,eff}$. Controller 280 for each user terminal may send feedback information (e.g., the downlink and/or uplink eigenvectors, eigenvalues, SNR estimates and so on) to the access point. Controllers 230 and 280 also control the operation of various processing units at access point 110 and user terminal 120, respectively.

Figure 3:
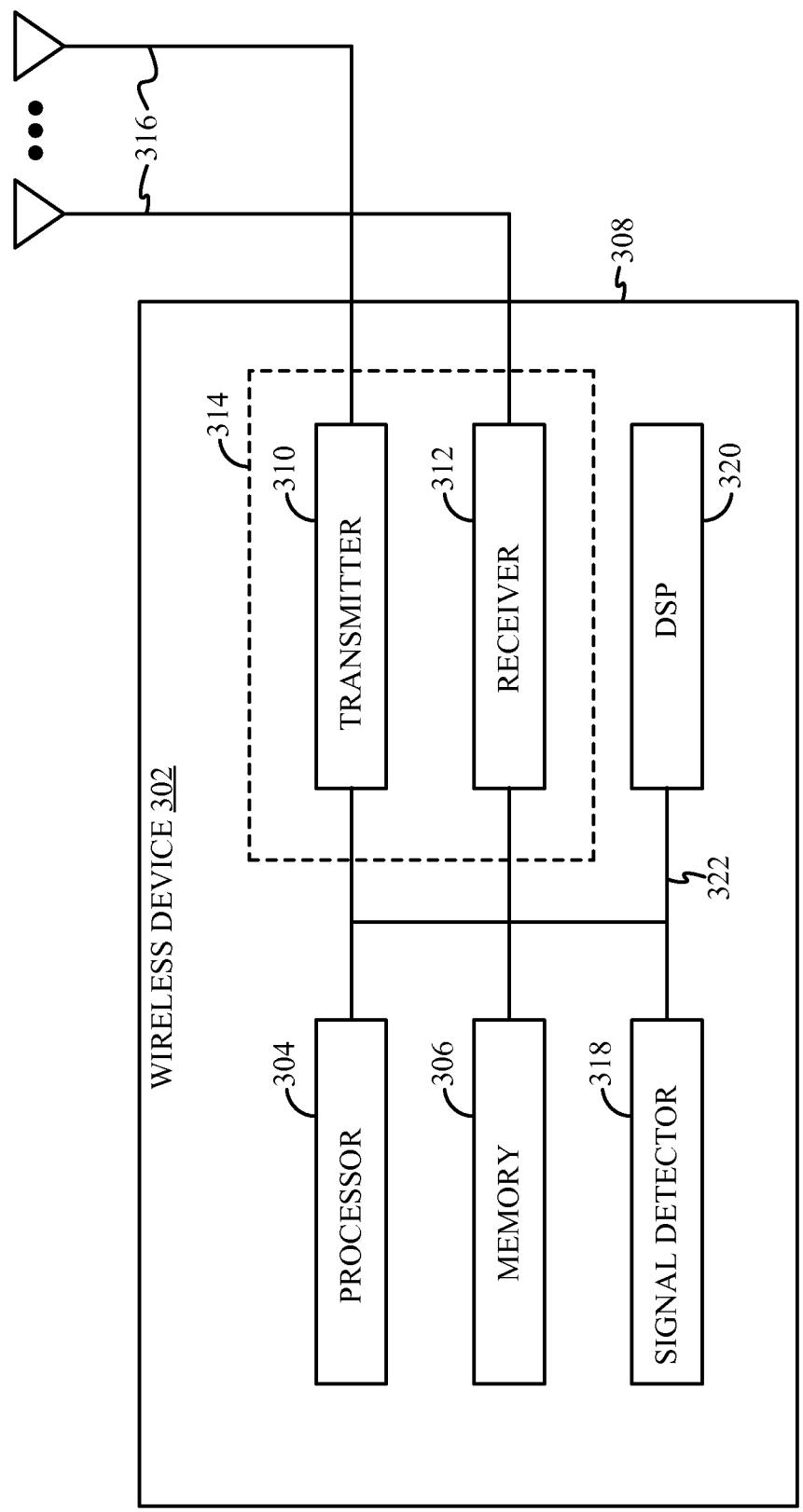
FIG. 3 illustrates a block diagram of an example wireless device in accordance with certain aspects of the present disclosure.

FIG. 3 illustrates various components that may be utilized in a wireless device 302 that may be employed within a wireless communication system, such as the MIMO system 100. The wireless device 302 is an example of a device that may be configured to implement the various methods described herein. The wireless device 302 may be an access point 110 or a user terminal 120.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A single or a plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

In next generation WLANs, such as the MIMO system 100 from FIG. 1, downlink (DL) multi-user (MU) MIMO transmission may represent a promising technique to increase overall network throughput. In most aspects of a DL MU-MIMO transmission, a non-beamformed portion of a preamble transmitted from an access point to a plurality of user stations (STAs) may carry a spatial stream allocation field indicating allocation of spatial streams to the STAs.

Example Network Setup in Wide Channel WLANs

According to certain aspects, STAs (Stations) may use two, four, or eight 20 MHz channels in IEEE 802.11ac to achieve higher data rates. In order to preserve CSMA (Carrier Sense Multiple Access)-type access, each STA may designate one of its 20 MHz channels as a primary channel (i.e., a control channel) and may perform 802.11-type CSMA access on that 20 MHz channel. For the other channels associated with the primary channel, which are typically referred to as secondary channels (i.e., extension channels), the STA may perform a so called PIFS (Point Coordination Function Interframe Space) access (as in IEEE 802.11n). I.e., on approaching the transmit time on the primary channel, the STA samples the channel for a short duration before beginning primary transmission to determine if there are any transmissions and then sends data on the secondary channels along with the data on the primary channel.

IEEE 802.11n lays down the following rules for 20 MHz and 40 MHz channels:
An AP (Access Point) operating a 20/40 MHz BSS (Basic Service Set), on detecting an OBSS (Overlapping BSS) whose primary channel is the AP's secondary channel, switches to 20 MHz BSS operation and may subsequently move to a different channel or pair of channels.
An IBSS (Independent BSS) DFS (Dynamic Frequency Selection) Owner (IDO) STA operating a 20/40 MHz IBSS, on detecting an OBSS whose primary channel is the IDO STA's secondary channel, may choose to move to a different pair of channels.
If the AP or IDO STA starts 20/40 MHz BSS in the 5 GHz band and the BSS occupies the same two channels as any existing 20/40 MHz BSSs, then the AP or IDO STA shall ensure that the primary channel of the new BSS is identical to the primary channel of the existing 20/40 MHz BSSs and that the secondary channel of the new 20/40 MHz BSS is identical to the secondary channel of the existing 20/40 MHz BSSs, unless the AP discovers that there are existing 20/40 MHz BSSs on these two channels with different primary and secondary channels.

If an AP or IDO starts a 20/40 MHz BSS in the 5 GHz band, the selected secondary channel should correspond to a channel on which no beacons are detected during the dot11 BSS Width Channel Transition—Delay Factor OBSS scan time performed by the AP or IDO STA, unless there are beacons detected on both the selected primary and secondary channels.

A High Throughput (HT) AP or an IDO STA that is also an HT STA should not start a 20 MHz BSS in the 5 GHz band on a channel that is the secondary channel of an existing 20/40 MHz BSS.

These rules may be extended to include 80 MHz and 160 MHz BSSs. For example, in an aspect, if a new network intends to use the exact set of channels that an existing network uses, then the primary channel of the new network may most likely be the same as the primary channel of the existing network. In an aspect, if a new network sees two or more existing networks that use the same channels but have different primary channels, the new network is free to choose any primary channel of the two or more existing networks as the new network's own primary channel.

In an aspect, if a new network intends to use a subset of channels that an existing network uses and that subset contains the primary channel, then the primary channel of the new network may most likely be the same as the primary channel of the existing network. If more than one primary channel is detected, any of the primary channels may be selected. In an aspect, a new network may typically avoid using a primary channel of an existing network (e.g., where a beacon is detected) as the new network's secondary channel. In another aspect, a new network may usually avoid using a set of channels that are known to be the secondary channels of an existing network.

In certain aspects, for new 160 MHz networks with two or more sets of adjacent channels, an 80 MHz segment that contains the primary channel (i.e., a primary segment) uses the same general rules as used by 80 MHz-only networks listed above. Further, the remaining 80 MHz segment that contains only secondary channels should not overlap with the primary channels of any existing networks. I.e., if there is any existing network with a primary channel in one of the four 20 MHz channels that constitute the 80 MHz segment, the 80 MHz segment should not be used (or should at least be avoided).

Figure 4:
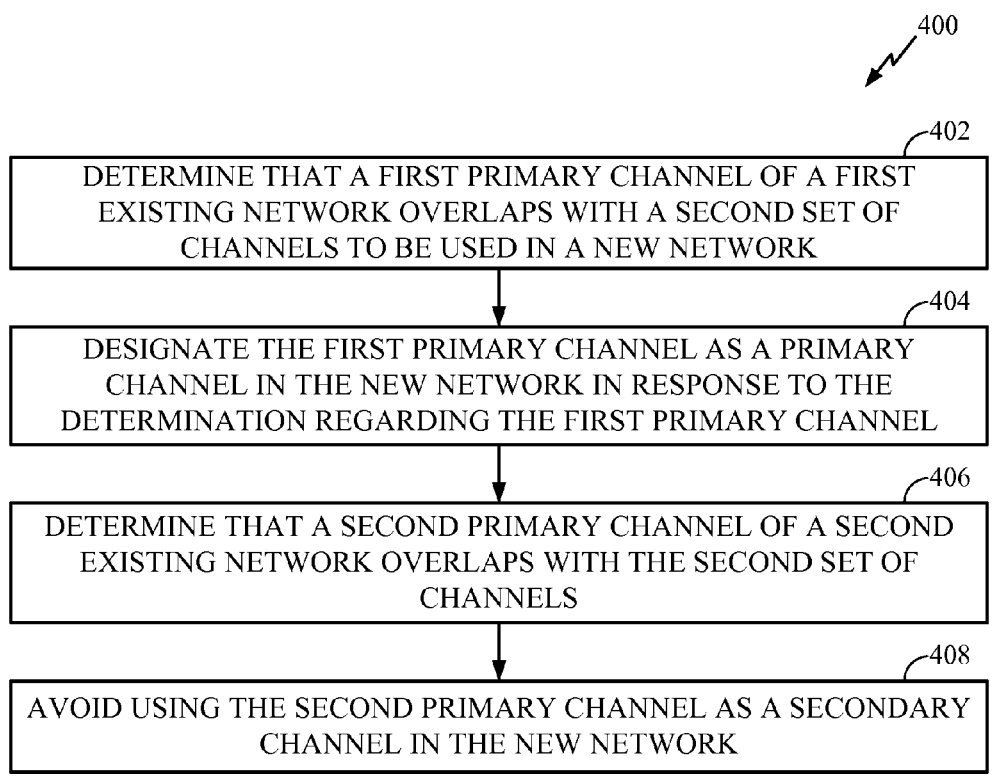
FIG. 4 illustrates example operations that may be performed at an access point for channel designation in accordance with certain aspects of the present disclosure.

FIG. 4 illustrates example operations 400 that may be performed at an access point for channel designation in accordance with certain aspects of the present disclosure. The operations 400 may begin, at 402, by determining that a first primary channel of a first existing network overlaps with a second set of channels to be used in a new network. At 404, the first primary channel may be designated as a primary channel in the new network in response to the determination. At 406, it is determined that a second primary channel of a second existing network overlaps with the second set of channels. At 408, the second primary channel is avoided for use as a secondary channel in the new network.

Figure 5:
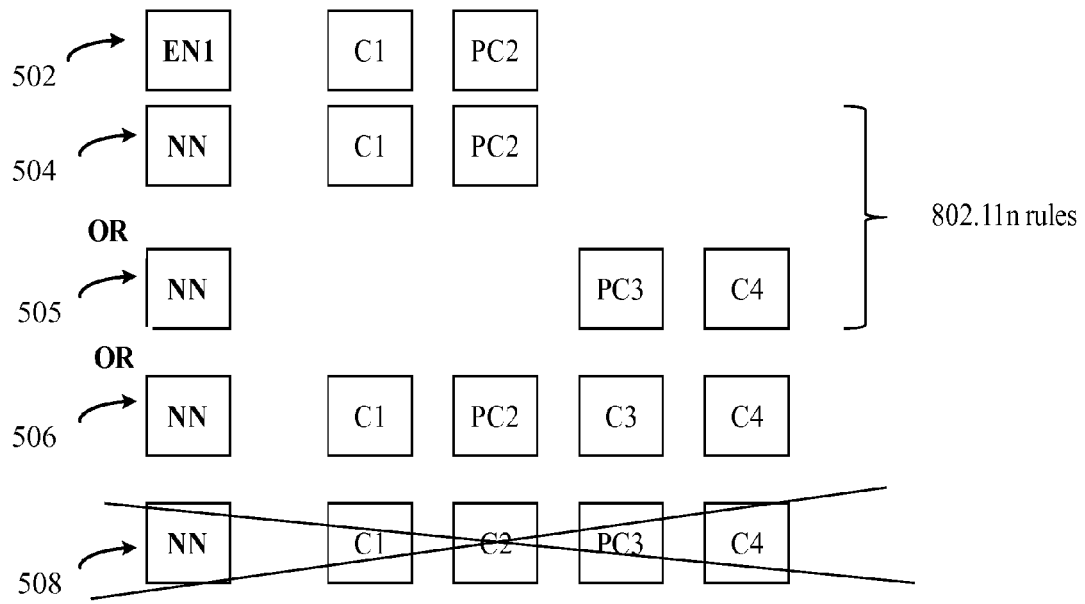
FIG. 5 illustrates example channel designation for new networks with an existing 40 MHz network in accordance with certain aspects of the present disclosure.

FIG. 5 illustrates example channel designation for new networks with an existing 40 MHz network in accordance with certain aspects of the present disclosure. Existing network EN1 502 is a 40 MHz network including a 20 MHz primary channel PC2 and a 20 MHz secondary channel C1.

In certain aspects, with one existing 40 MHz network, 80 MHz operation for a new network may be permitted if both the existing and the new networks share the primary channel. Further, the primary channel of a new 40 MHz network may most likely overlap with that of the existing network if the new 40 MHz network is on the band of the existing network.

For example, the channels of new network NN 504 overlap with those of EN1 502, and thus, the primary channel PC2 is shared among the two networks. The channels of NN 505 do not overlap with any of the channels of EN1 502, and thus, NN 505 is free to select any of its two channels as the primary channel. For example, as shown in FIG. 5, PC3 is selected as the primary channel and C4 is selected as the secondary channel for NN 505.

NN 506 is an 80 MHz network with its channels partially overlapping with those of EN1 502 and, thus, shares the primary channel PC2 with EN1 502. NN 508 (which is also an 80 MHz network) is not allowed because NN 508's primary channel PC3 does not overlap with PC2 of EN1 502.

Figure 6:
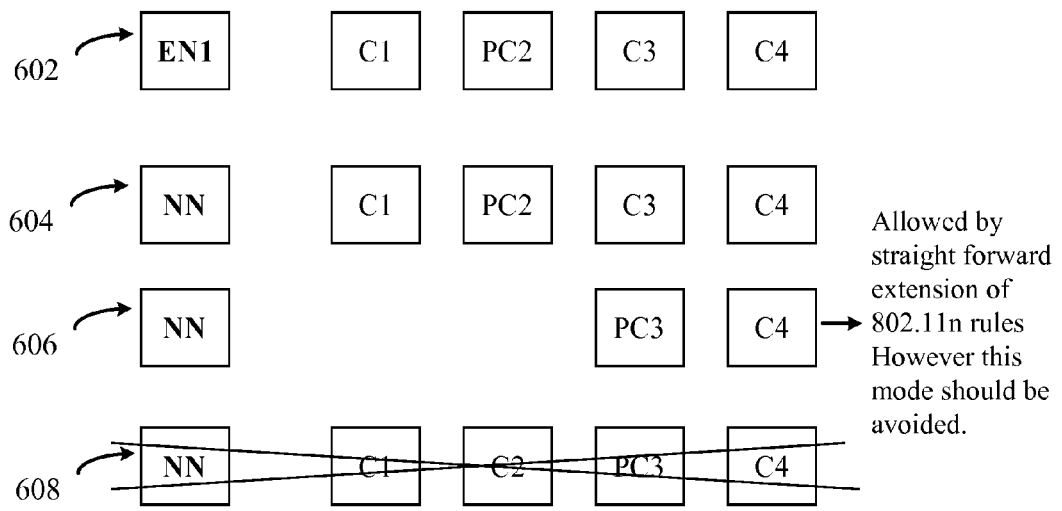
FIG. 6 illustrates example channel designation for new networks with an existing 80 MHz network in accordance with certain aspects of the present disclosure.

FIG. 6 illustrates example channel designation for new networks with an existing 80 MHz network in accordance with certain aspects of the present disclosure. Existing network EN1 602 is an 80 MHz network including a primary channel PC2 and secondary channels C1, C3, and C4.

In certain aspects, with an existing 80 MHz network, primary channel of a new 80 MHz network may most likely overlap the primary of the existing network. A new 40 MHz network with its channels overlapping the existing network is allowed if the new 40 MHz network's primary channel overlaps the primary of the existing network. In certain aspects, a 40 MHz network overlapping the 40 MHz segment of the existing network containing only secondary channels (e.g., C3, C4) is permitted, but may most likely be avoided.

For example, new network NN 604 is an 80 MHz network with its channels overlapping those of EN1 602, and thus, shares its primary channel PC2 with EN1 602. New network NN 606 is a 40 MHz channel with its channels overlapping the secondary channels C3 and C4 of EN1 602 and its primary channel PC3 overlapping C3 of EN 602. Operation of NN 606 is allowed by straightforward extension of the IEEE 802.11n rules, but, should be avoided. In certain aspects, new network NN 608—which is an 80 MHz network with its primary channel PC3 overlapping the secondary channel C3 of EN 602—may not be allowed.

Figure 7:
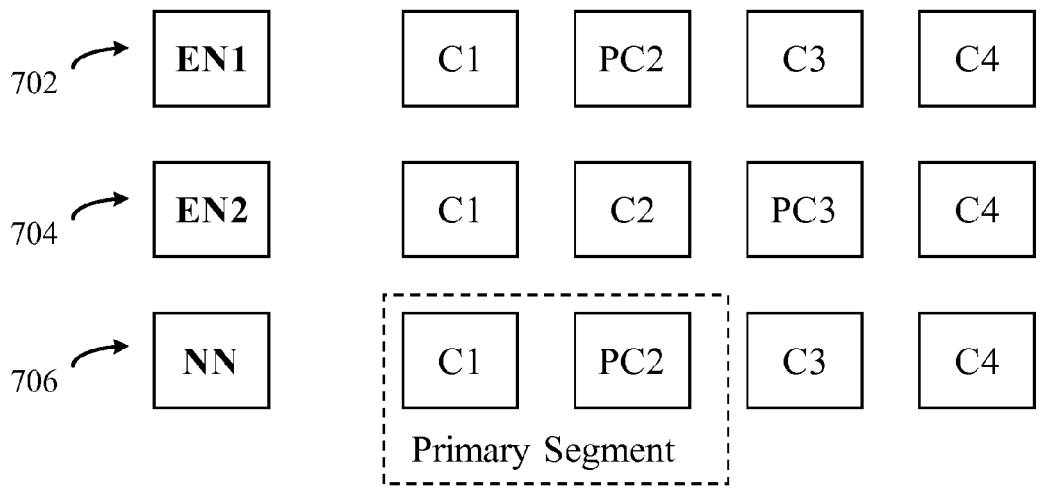
FIG. 7 illustrates example channel designation for a new 80 MHz network with two existing 80 MHz networks in accordance with certain aspects of the present disclosure.

FIG. 7 illustrates example channel designation for a new 80 MHz network with two existing 80 MHz networks in accordance with certain aspects of the present disclosure. Existing networks EN1 702 and EN2 704 are 80 MHz networks with different designated primary channels PC2 and PC3, respectively.

In certain aspects, with two existing 80 MHz networks with primary channels of each of the two networks in different 40 MHz segments (e.g., Hidden BSS case), a new network may be free to use the channels of either of the two existing 80 MHz networks and may further be free to choose a 40 MHz primary segment that contains the primary channel. However, within the selected 40 MHz primary segment, the new network may most likely select its primary channel to be the same as the primary channel of the existing 80 MHz network that has a primary in that 40 MHz segment.

For example, new network NN 706 is an 80 MHz network with its 40 MHz primary segment overlapping with the 40 MHz segment of EN 702 and with its primary channel within the primary segment overlapping PC2 of EN1 702.

Figure 8:
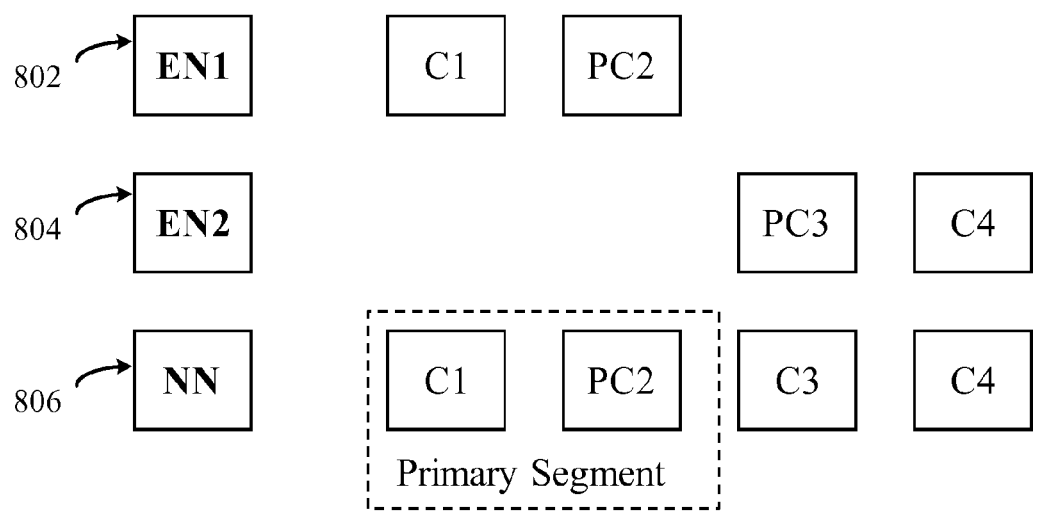
FIG. 8 illustrates example channel designation for a new 80 MHz network with two existing 40 MHz networks in accordance with certain aspects of the present disclosure.

FIG. 8 illustrates example channel designation for a new 80 MHz network with two existing 40 MHz networks in accordance with certain aspects of the present disclosure. Existing networks EN1 802 and EN2 804 are 40 MHz non-overlapping networks with different designated primary channels PC2 and PC3, respectively.

In certain aspects with two existing 40 MHz networks, a new network is free to use the channels of both 40 MHz networks for 80 MHz operation. The new network may further be free to select a 40 MHz primary segment that may likely contain the primary. However, within the selected 40 MHz primary segment, the new network may most likely select its primary channel to be the same as the primary channel of the existing 40 MHz network overlapping its primary segment. For example, new network NN 806 is an 80 MHz network with its 40 MHz primary segment overlapping EN 802 and with its primary channel overlapping PC2 of EN1 802.

Figure 9:
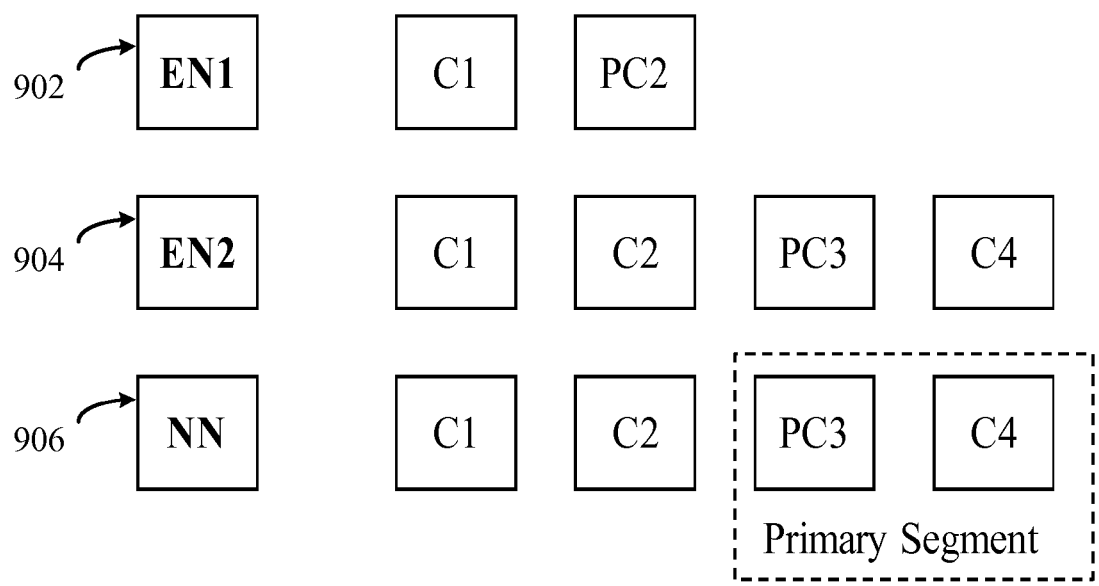
FIG. 9 illustrates example channel designation for a new 80 MHz network with an existing 40 MHz network and an existing 80 MHz network in accordance with certain aspects of the present disclosure.

FIG. 9 illustrates example channel designation for a new 80 MHz network with an existing 40 MHz network and an existing 80 MHz network in accordance with certain aspects of the present disclosure. Existing network (EN1) 902 is a 40 MHz network with primary channel PC2 and secondary channel C1. Existing network EN2 904 is an 80 MHz network with its primary channel PC3 not overlapping with PC2 of EN1 902.

In certain aspects, with one existing 40 MHz network and one existing 80 MHz network, channels of a new 80 MHz network may most likely overlap with the existing 80 MHz network with a primary channel shared between the new and existing 80 MHz networks. For example, new network NN 906 is an 80 MHz network with its channels overlapping EN2 904, and with its primary channel overlapping PC3 of EN2 904.

Figure 10:
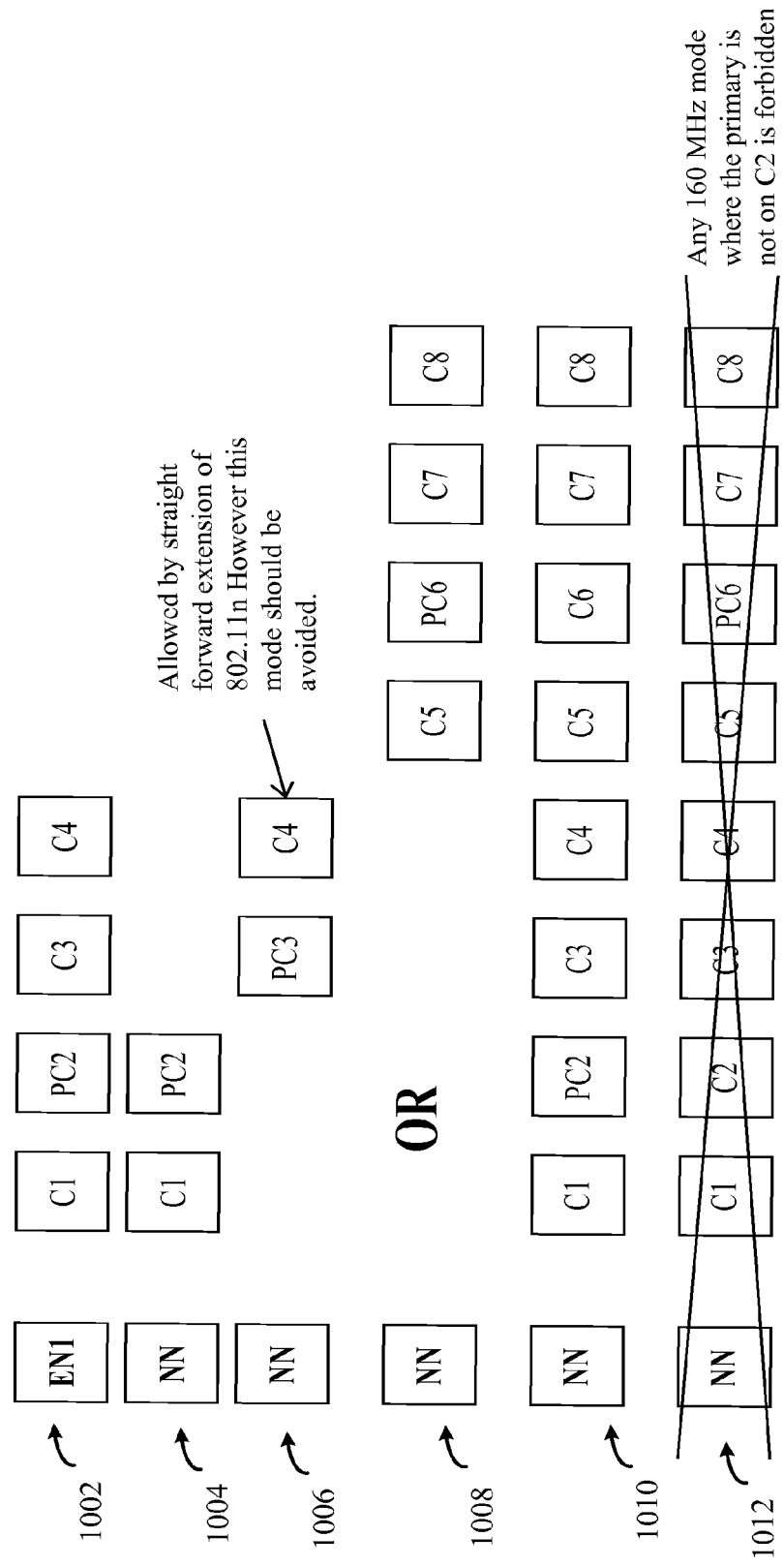
FIG. 10 illustrates example channel designation for new networks with an existing 80 MHz network in accordance with certain aspects of the present disclosure.

FIG. 10 illustrates example channel designation for new networks with an existing 80 MHz network in accordance with certain aspects of the present disclosure. Existing network EN1 1002 is an 80 MHz network with primary channel PC2 and secondary channels C1, C3, and C4.

In certain aspects, a new 40 MHz network NN 1004 with its primary channel overlapping PC2 and secondary channel overlapping C1 of EN1 1002 is allowed. New network NN 1006, another 40 MHz network with its channels overlapping the secondary channels C3 and C4 of EN1 1002 and with its primary channel PC3 overlapping the secondary channels C3 of EN1 1002, may also be allowed by straightforward extension of IEEE 802.11n rules, but however, may likely be avoided. New network NN 1008 is an 80 MHz network with none of its channels including its primary channel PC6 overlapping any of the channels in EN1 1002 is also allowed.

In certain aspects with one existing 80 MHz network, a new 160 MHz network may be permitted if the primary channel of the 160 MHz network overlaps the primary channel of the existing 80 MHz network. For example, new network NN 1010 is a 160 MHz network with its primary channel overlapping PC2 of EN1 1002. In an aspect, new network NN 1012—which is also a 160 MHz network, but with its primary channel PC6 not overlapping PC2 of EN1 1002—is not allowed.

Figure 11:
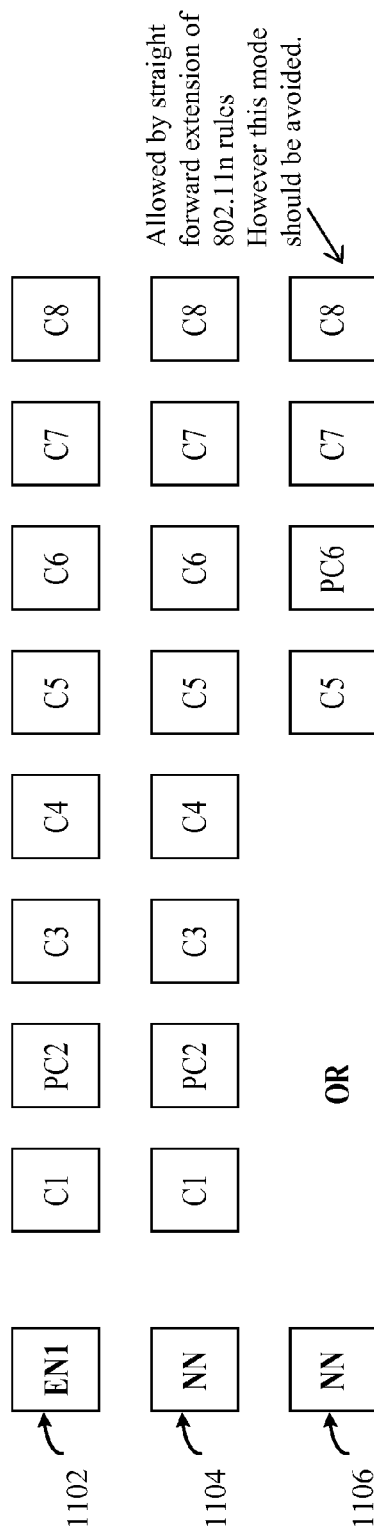
FIG. 11 illustrates example channel designation for new networks with an existing 160 MHz network in accordance with certain aspects of the present disclosure.

FIG. 11 illustrates example channel designation for new networks with an existing 160 MHz network in accordance with certain aspects of the present disclosure. Existing network EN1 1102 is a 160 MHz network with primary channel PC2 and secondary channels C1 and C3-C8.

In certain aspects, with a 160 MHz existing network EN1 1102, a new 40 MHz network on channels C1-C2 may be permitted as long as the new network designates the same primary channel PC2 as EN1 1102. Further, a new 80 MHz network on channels C1-C4 may be permitted as long as the new network designates the same primary channel PC2 as EN1 1102.

In certain aspects, a new 160 MHz network on channels C1-C8 may be permitted if the new network designates the same primary PC2 as EN1 1102. For example, new network NN 1104 is a 160 MHz network with its primary channel overlapping PC2 of EN1 1102.

In an aspect, 40/80 MHz networks are permitted on channels C5 to C8 that do not contain the primary channel of EN1 1102 by straightforward extension of IEEE 802.11n rules, but however, may most likely be avoided. For example new network NN 1106—which is an 80 MHz network on channels C5 to C8 with its primary channel PC6 overlapping the secondary channel C6 of EN1 1102—may likely be avoided. However, if NN 1012 is used, EN1 may typically stop using channels C5 to C8.

Figure 12:
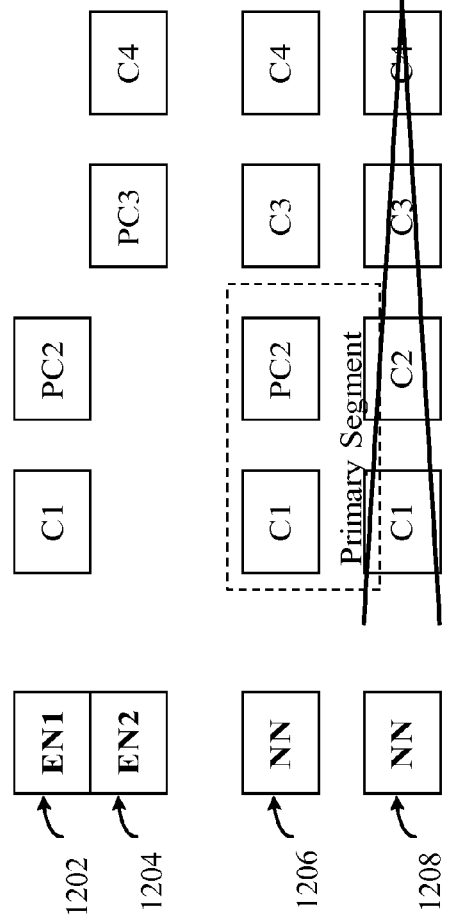
FIG. 12 illustrates example channel designation for new networks with two existing 40 MHz networks in accordance with certain aspects of the present disclosure.

FIG. 12 illustrates example channel designation for new networks with two existing 40 MHz networks in accordance with certain aspects of the present disclosure. Existing networks EN1 1202 and EN2 1204 are 40 MHz networks with different designated primary channels PC2 and PC3, respectively.

In certain aspects with two existing 40 MHz networks, a new 160 MHz network may be free to use both the 40 MHz networks as an 80 MHz segment. Further, the new network may most likely select one of the existing 40 MHz networks as its primary segment. Within the selected 40 MHz primary segment, the new network may most likely select its primary channel to be the same as the primary channel of the existing 40 MHz network in the primary segment.

In certain aspects, this principle may be extended to three existing networks. For example, new 160 MHz network NN 1206 uses the existing 40 MHz networks EN1 1202 and EN2 1204 as its 80 MHz segment, with its 40 MHz primary segment overlapping with EN1 1202 and with its primary channel overlapping PC2 of EN1 1202. In an aspect, new network NN 1208—which is also a 160 MHz network, but without its primary segment overlapping any of the existing networks EN1 1202 and EN2 1204 and without its primary channel PC6 overlapping any primary channels of the existing networks EN1 1202 and EN2 1204—is not allowed.

Figure 13:
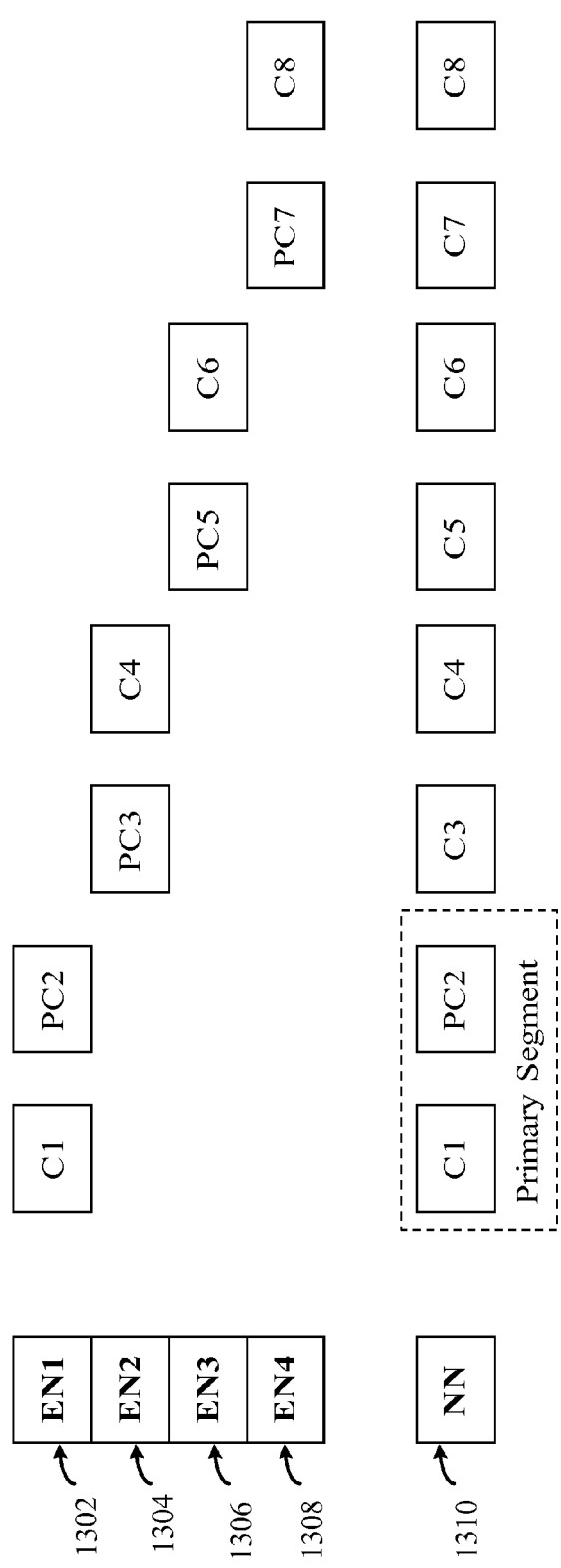
FIG. 13 illustrates example channel designation for a new 160 MHz network with four existing 40 MHz networks in accordance with certain aspects of the present disclosure.

FIG. 13 illustrates example channel designation for a new 160 MHz network with four existing 40 MHz networks in accordance with certain aspects of the present disclosure. Existing networks EN1 1302, EN2 1304, EN3 1306, and EN4 1308 are 40 MHz networks with different designated primary channels PC2, PC3, PC5, and PC7, respectively, and none of the secondary channels overlapping among them.

In certain aspects, with four existing 40 MHz networks, a new 160 MHz network may be free to use all four existing 40 MHz segments for 160 MHz operation. Further, the new network may be free to select a 40 MHz primary segment that most likely contains the new network's primary channel. However, within the selected 40 MHz primary segment, the new network may most likely select its primary channel to be the same as the primary channel of the existing 40 MHz network in the primary segment. For example, new 160 MHz network NN 1310 uses all four existing networks with its primary segment (C1, C2) overlapping EN1 1302 and its primary channel overlapping PC2 of EN1 1302.

Figure 14:
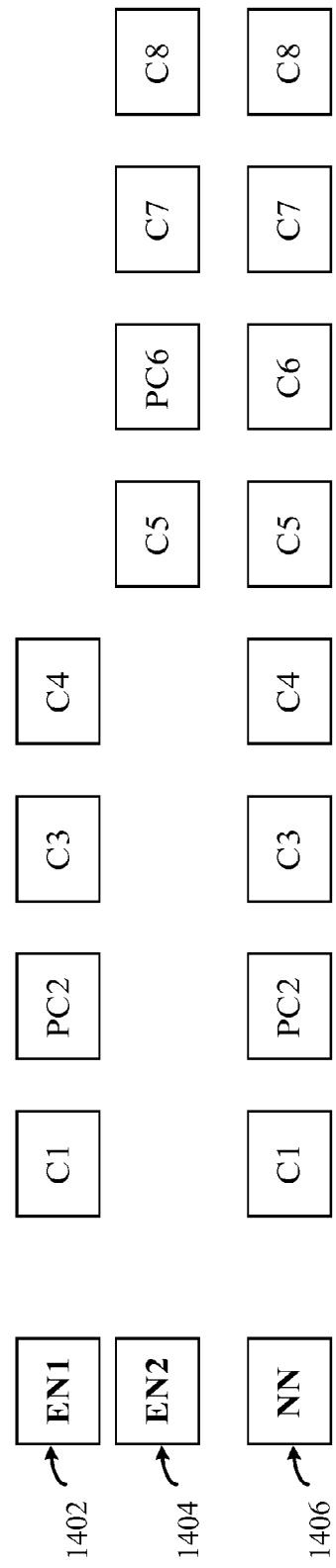
FIG. 14 illustrates example channel designation for a new 160 MHz network with two existing 80 MHz networks in accordance with certain aspects of the present disclosure.

FIG. 14 illustrates example channel designation for a new 160 MHz network with two existing 80 MHz networks in accordance with certain aspects of the present disclosure. Existing networks EN1 1402 and EN2 1404 are 80 MHz networks with different primary channels PC2 and PC6, respectively, and with none of the secondary channels overlapping between them.

In certain aspects, with two existing 80 MHz networks a new 160 MHz network may be free to use both the existing 80 MHz networks for 160 MHz operation. Further, the new network may be free to select an 80 MHz primary segment that may likely contain its primary channel. However, within the selected 80 MHz primary segment, the new network may most likely select its primary channel to be the same as the primary channel of the existing 80 MHz network in the primary segment. For example, new 160 MHz network NN 1406 uses both the existing 80 MHz networks with its primary 80 MHz segment overlapping EN1 1402 and with its primary channel overlapping PC2 of EN1 1402.

Active Intolerance Indication

IEEE 802.11n includes the facility to signal 20/40 MHz intolerant operation for the 2.4 GHz band:
- A 40 MHz AP that hears an intolerant bit (IB) is required to switch to 20 MHz.
- An STA needs to report (to its own AP), if the intolerant bit is set for any OBSS AP that the STA can hear.
- APs are required to switch to 20 MHz operation on receiving an intolerant bit setting from a reporting STA These rules may be extended to IEEE 802.11ac in 5 GHz. For example, a high bandwidth BSS may be asked to release some of its secondary channels if an STA reports intolerance. Further, an intolerance message from an STA may indicate the channels that may most likely be released.

Passive Intolerance Indication

The primary motivation of this technique is to protect a current network's primary channel from being used as the secondary channel of a new network. In certain aspects, a primary use of this technique is to avoid a low bandwidth network (possibly carrying Quality of Service (QoS) flows) being interfered by a secondary channel of a higher bandwidth BSS.

According to certain aspects, the following priority relations may be defined:
a. 20 MHz BSSs may be intolerant to secondary channels of 40, 80, and 160 MHz BSSs
b. 40 MHz BSSs may be intolerant to secondary channels of 80 and 160 MHz BSSs
c. 80 MHz BSSs may be intolerant to secondary channels of 160 MHz BSSs In certain aspects, as a rule, a new BSS shall not use as a secondary channel, the channel being used as primary by a lower bandwidth BSS which set an intolerant indication. This mechanism typically works only in cases where the lower bandwidth network exists before the high bandwidth network is started and if STAs/APs do not decode "secondary channel only" packets.

In certain aspects, a high bandwidth network may be forced to operate on a smaller set of channels upon receiving an intolerance indication (e.g., via an intolerance bit) from another network. The intolerance indication typically specifies the channels that may be released.

In certain aspects, a network, on receiving the intolerance indication, may decide to comply with the intolerance indication based on a precedence method or metric. The precedence metric may be a function of the amount of bandwidth that a network uses. Further, the precedence metric may be a function of the type and quality of service requirements of the traffic in the network. In certain aspects, an intolerance indication includes setting an intolerance bit to 1.

Figure 15:
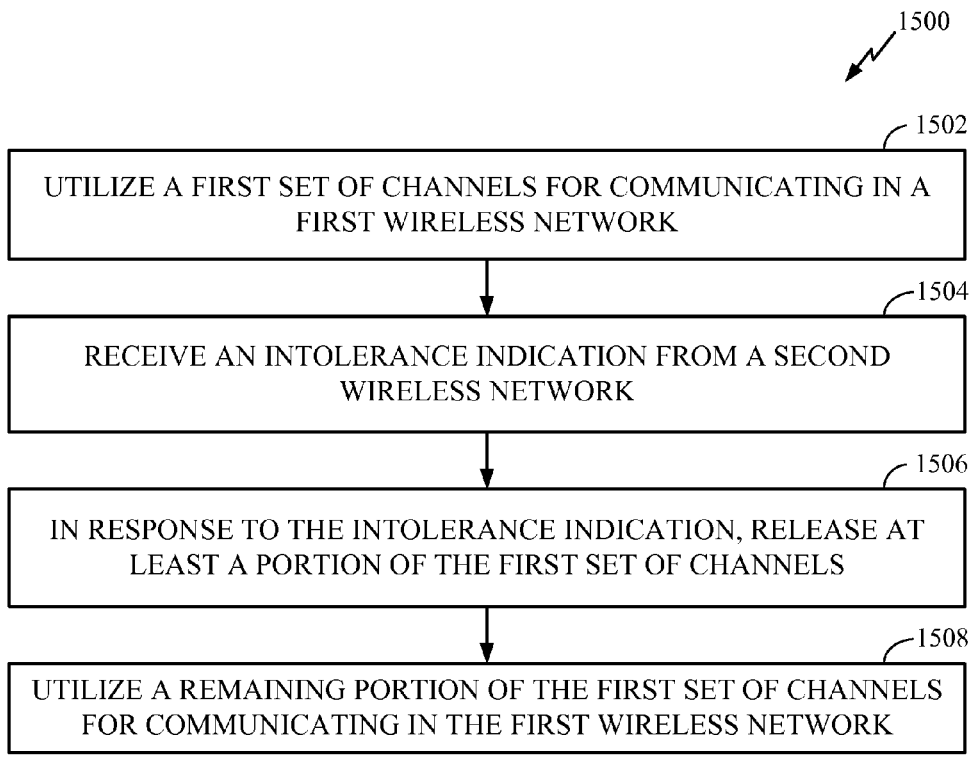
FIG. 15 illustrates example operations that may be performed at an access point for performing IB (Intolerance Bit) operations in accordance with certain aspects of the present disclosure.
Figure 15A:
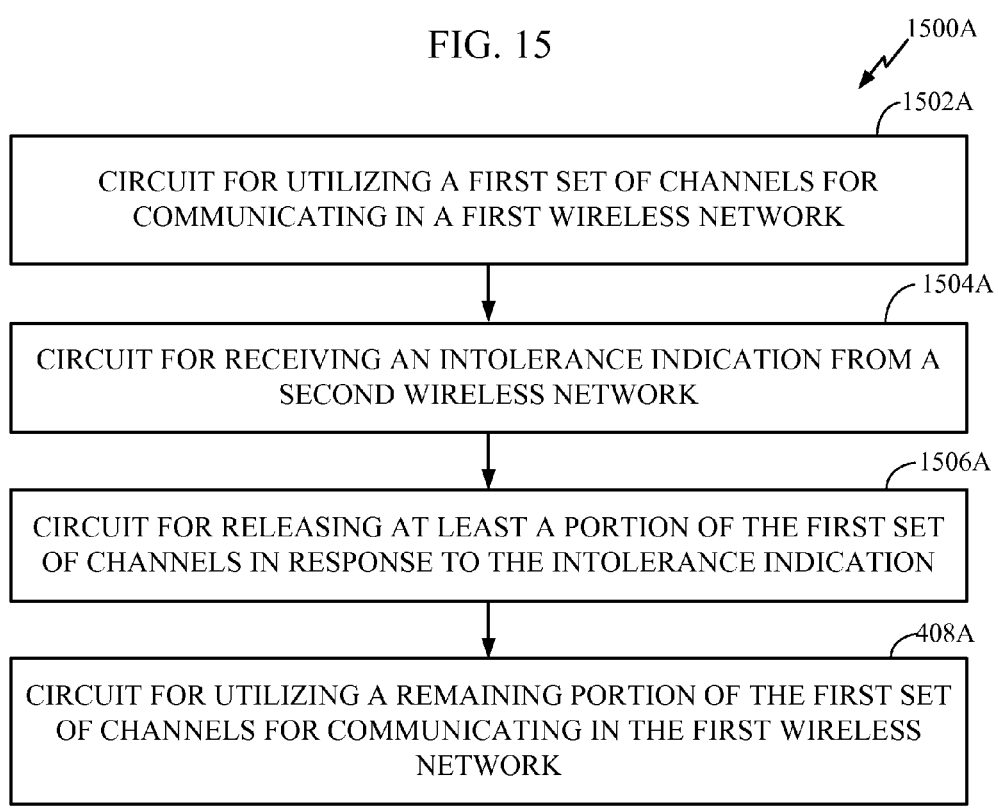
FIG. 15A illustrates example circuits capable of performing the operations shown in FIG. 15.

FIG. 15 illustrates example operations 1500 that may be performed at an access point, for example, for performing IB (Intolerance Bit) operations in accordance with certain aspects of the present disclosure. The operations 1500 may begin, at 1502, by utilizing a first set of channels for communicating in a first wireless network. At 1504, an intolerance indication may be received from a second wireless network. At 1506, in response to the intolerance indication, at least a portion of the first set of channels may be released. At 1508 a remaining portion of the first set of channels may be utilized for communicating in the first wireless network.

For certain aspects, a precedence for which channels to release may be determined. This determination may comprise comparing an amount of bandwidth used by the first network to an amount of bandwidth used by the second network or comparing at least one of a type or quality of service requirement of traffic in the first network to at least one of a type or quality of service requirement of traffic in the second network. The at least the portion of the first set of channels may be released based on the precedence.

Figure 16:
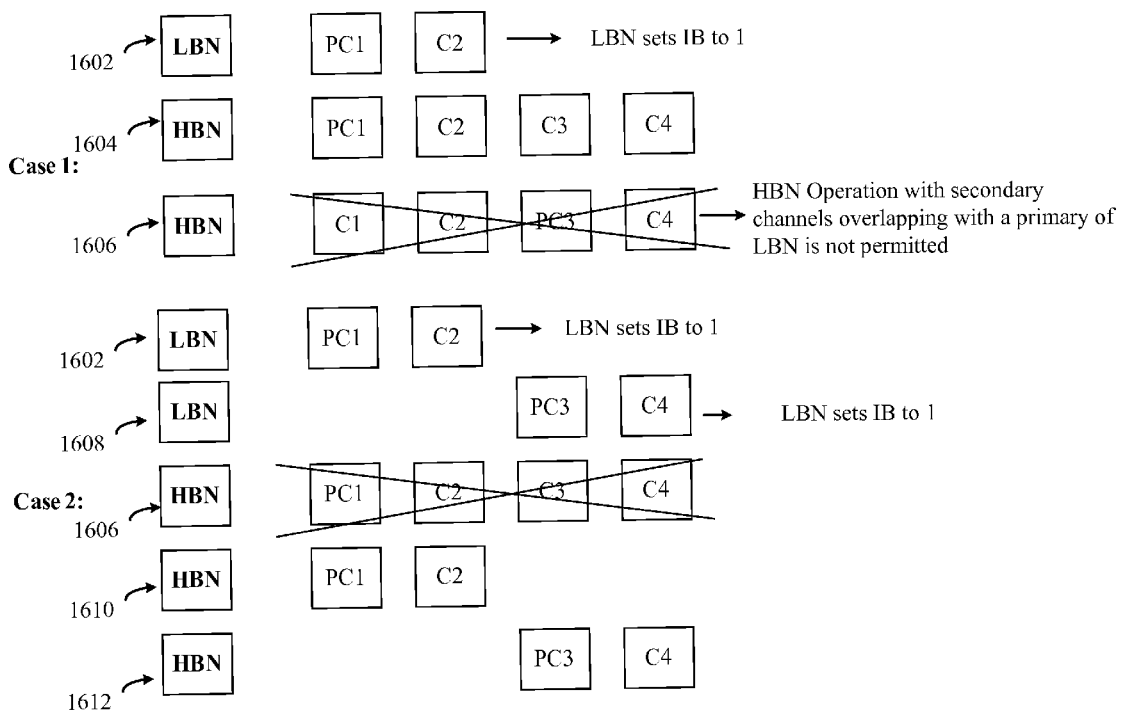
FIG. 16 illustrates example IB operations for existing LBNs (Low Bandwidth Networks) in accordance with certain aspects of the present disclosure.

FIG. 16 illustrates example IB operations for existing LBNs (Low Bandwidth Networks) in accordance with certain aspects of the present disclosure. LBN 1602 is a 40 MHz low bandwidth network with a primary channel PC1 and a secondary channel C2. LBN 1608 is also a low bandwidth network with a primary channel PC3 and a secondary channel C4.

In certain aspects, if an existing low bandwidth network (e.g., LBN 1602 or LBN 1608) sets its IB (Intolerant Bit) to 1, then when a new high bandwidth (HB) network (e.g., HBN 1604 or HBN 1606) starts up, the high bandwidth network may operate with a higher bandwidth if its primary channel is aligned with the primary channel of the existing low bandwidth network.

In certain aspects, the new high bandwidth network is not allowed to operate with one of its secondary channels overlapping with the primary channel of the low bandwidth network. Thus, the IB operation may restrict the high bandwidth operation of high bandwidth networks.

For example, in Case 1, LBN 1602 has the intolerance bit set to 1. New network HBN 1604 is an 80 MHz high bandwidth network with its primary channel aligned with the primary channel of LBN 1602, and thus, is allowed to operate. However, HBN 1606—with its secondary channel C1 overlapping the primary channel PC1 of LBN 1602—is not allowed.

In certain aspects, the IB operation may cause many networks either to share the same primary channel or operate at a lower bandwidth in disjoint channels. For example, in Case 2, LBN 1602 and LBN 1608 are existing networks with their respective intolerance bits set to 1. New network HBN 1606—with its secondary channel C3 overlapping the primary channel PC3 of LBN 1608—is not allowed. Thus, in response to an IB indication from LBN 1602 and LBN 1608, HBN 1606 may operate in disjoint 40 MHz segments, each segment having its primary channel overlapping one of the existing low bandwidth networks. For example, HBN 1606 may operate in two disjoint 40 MHz segments HBN 1610 and HBN 1612 with the primary channel of HBN 1610 overlapping with PC1 of LBN 1602 and the primary channel of HBN 1612 overlapping PC3 of LBN 1608. In an aspect, HBN 1606 may simply drop the secondary channels overlapping the primary channel of LBN 1608.

Figure 17:
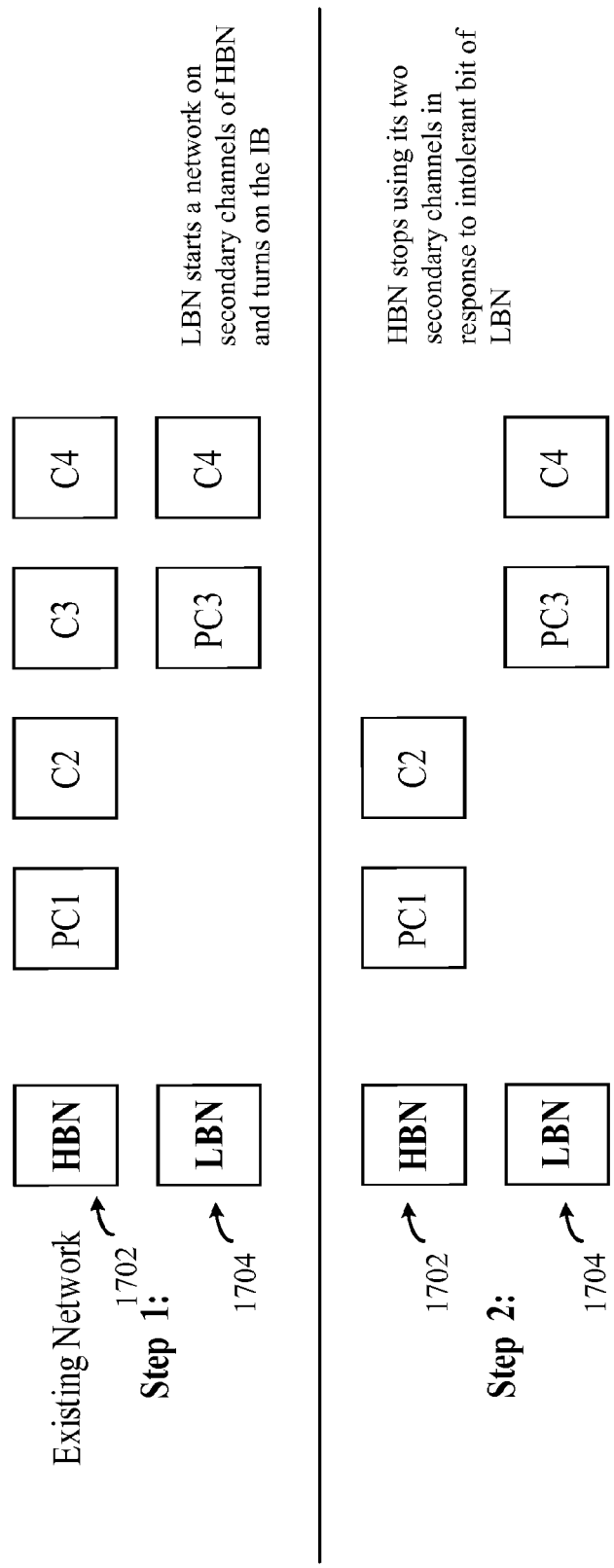
FIG. 17 illustrates example IB operations for existing HBNs (High Bandwidth Networks) in accordance with certain aspects of the present disclosure.

FIG. 17 illustrates example IB operations for existing HBNs (High Bandwidth Networks) in accordance with certain aspects of the present disclosure. HBN 1702 is an existing 80 MHz high bandwidth network with primary channel PC1 and secondary channels C2, C3, and C4. LBN 1704 is a new low bandwidth network with primary channel PC3 overlapping the secondary channel C3 of HBN1.

In certain aspects, a lower bandwidth BSS may force a higher bandwidth BSS to stop using its secondary channels. For example, in Step 1, LBN 1704 starts a network on secondary channels C3 and C4 of HBN 1702 and turns on (i.e., sets) its Intolerance bit. In Step 2, in response to receiving the intolerance indication from LBN 1704, HBN 1702 may stop using its two secondary channels C3 and C4.

Figure 18:
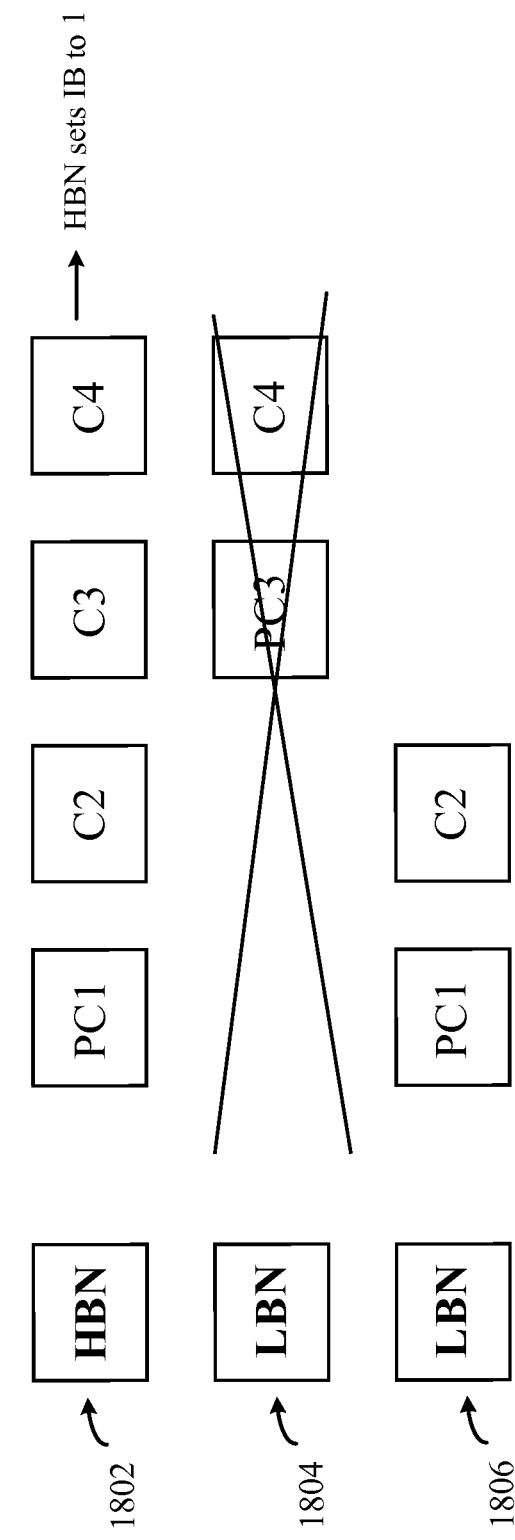
FIG. 18 illustrates example IB operation with an existing HBN in accordance with certain aspects of the present disclosure.

FIG. 18 illustrates example IB operation with an existing HBN (High Bandwidth Network) in accordance with certain aspects of the present disclosure. HBN 1802 is an existing 80 MHz high bandwidth network with primary channel PC1 and secondary channels C2, C3, and C4. LBN 1804 and LBN 1806 are new 40 MHz low bandwidth networks.

In certain aspects, an established network (e.g., an enterprise network or a hotspot network) may want to prevent auxiliary low bandwidth networks from starting in the established network's secondary channel. In certain aspects, if an existing high bandwidth network provides an intolerance indication by setting its intolerance bit to 1, a new low bandwidth network may not be allowed to operate with its primary channel overlapping a secondary channel of the existing high bandwidth network. The new low bandwidth network may, however, operate with its primary channel aligned with the primary channel of the existing high bandwidth network.

For example LBN 1804 with its primary channel PC3 overlapping the secondary channel C3 of HBN 1802 is not allowed. However, LBN 1806 with its primary channel aligned with PC1 of HBN 1802 is allowed.

Figure 19:
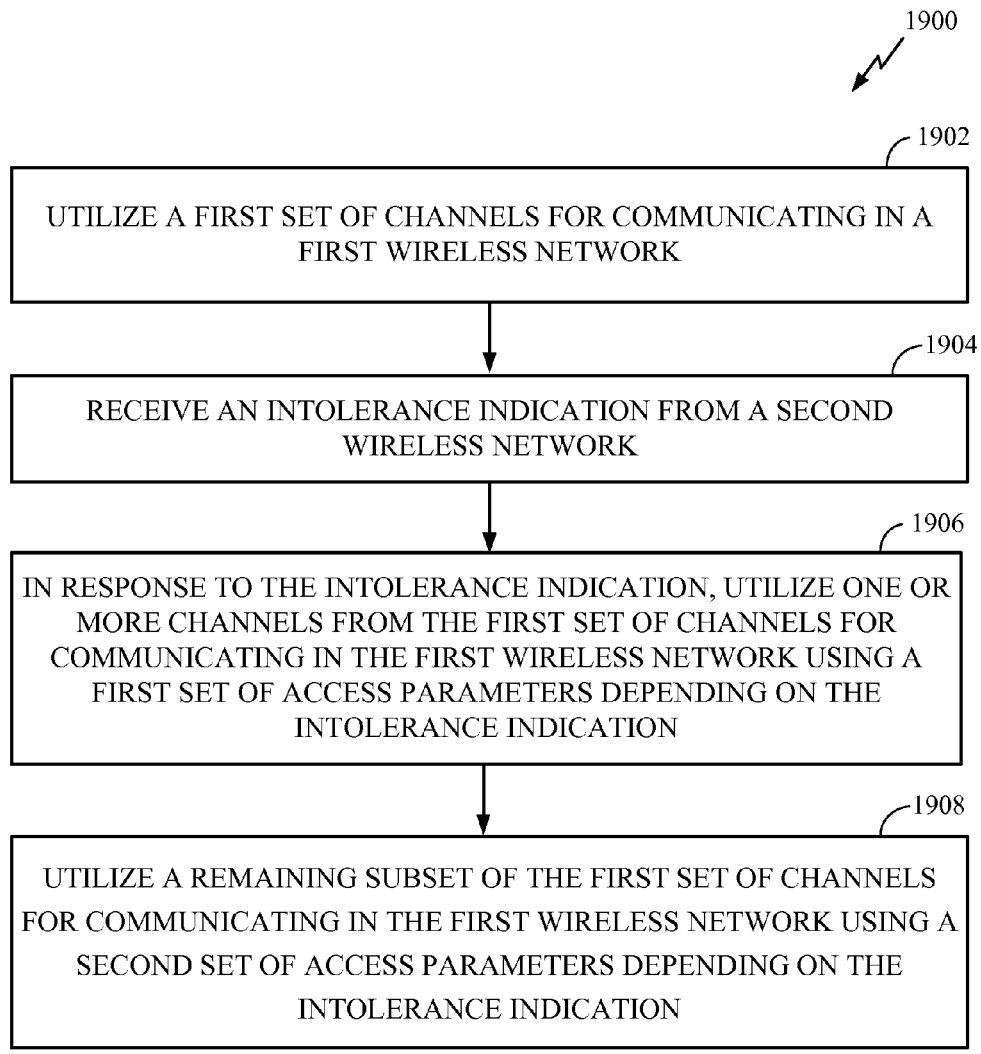
FIG. 19 illustrates example operations that may be performed at an access point for performing IB operations in accordance with certain aspects of the present disclosure.
Figure 19A:
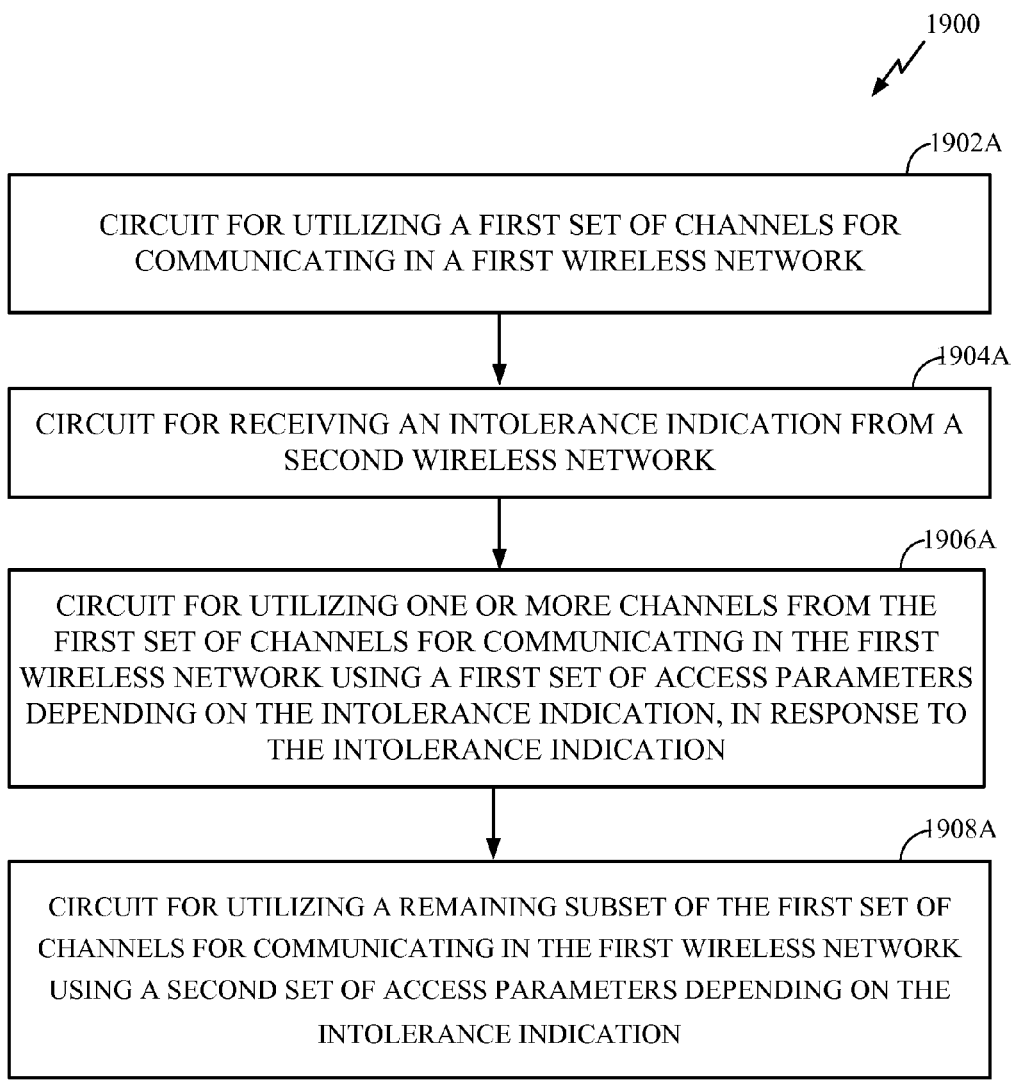
FIG. 19A illustrates example circuits capable of performing the operations shown in FIG. 19.

FIG. 19 illustrates example operations 1900 that may be performed at an access point for performing IB (Intolerance Bit) operations in accordance with certain aspects of the present disclosure. The operations 1900 may begin, at 1902, by utilizing a first set of channels for communicating in a first wireless network. At 1904, an intolerance indication may be received from a second wireless network. At 1906, in response to receiving the intolerance indication, one or more channels from the first set of channels may be utilized for communicating in the first wireless network using a first set of access parameters depending on the intolerance indication. At 1908, a remaining subset of the first set of channels may be utilized for communicating in the first wireless network using a second set of access parameters depending on the intolerance indication. The first and/or the second set of access parameters may comprise at least one of a contention window value or an allowed access category.

Figure 4A:
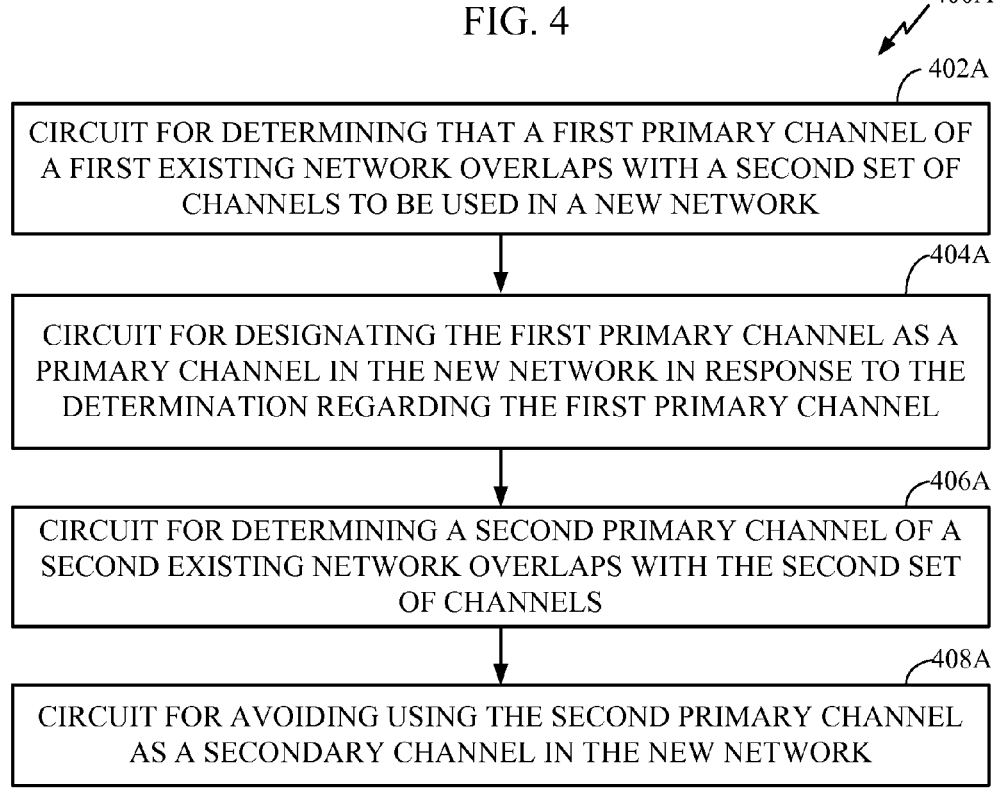
FIG. 4A illustrates example circuits capable of performing the operations shown in FIG. 4.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in Figures, those operations may have corresponding counterpart means-plus-function components with similar numbering. For example, operations 400 illustrated in FIG. 4 correspond to circuits 400A illustrated in FIG. 4A.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the wireless node, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications, comprising:
using a first set of channels for communicating in a first wireless network;
receiving an intolerance indication from a second wireless network;
determining, in response to receiving the intolerance indication, whether to comply with the intolerance indication based on a first precedence metric of the first wireless network and a second precedence metric of the second wireless network, wherein determining whether to comply with the intolerance indication comprises comparing the first precedence metric to the second precedence metric, and wherein the first precedence metric comprises an amount of bandwidth used by the first wireless network and the second precedence metric comprises an amount of bandwidth used by the second wireless network;

releasing at least a portion of the first set of channels based on the determination; and using a remaining portion of the first set of channels for communicating in the first wireless network.

2. The method of claim 1, wherein the first wireless network uses a higher channel bandwidth than the second wireless network.

3. The method of claim 1, wherein releasing the at least the portion of the first set of channels comprises releasing one or more secondary channels from the first set of channels.

4. A method for wireless communications, comprising:

using a first set of channels for communicating in a first wireless network;

receiving an intolerance indication from a second wireless network;

determining, in response to receiving the intolerance indication, whether to comply with the intolerance indication based on a first precedence metric of the first wireless network and a second precedence metric of the second wireless network, wherein determining whether to comply with the intolerance indication comprises comparing the first precedence metric to the second precedence metric, and wherein the first precedence metric comprises at least one of a type or quality of service requirement of traffic in the first wireless network and the second precedence metric comprises at least one of a type or quality of service requirement of traffic in the second wireless network;

releasing at least a portion of the first set of channels based on the determination; and using a remaining portion of the first set of channels for communicating in the first wireless network.

5. An apparatus for wireless communications, comprising:

a first circuit configured to use a first set of channels for communicating in a first wireless network;

a second circuit configured to receive an intolerance indication from a second wireless network;

a third circuit configured to determine, in response to receiving the intolerance indication, whether to comply with the intolerance indication based on a first precedence metric of the first wireless network and a second precedence metric of the second wireless network, wherein the third circuit is configured to determine whether to comply with the intolerance indication by comparing the first precedence metric to the second precedence metric, and wherein first precedence metric comprises an amount of bandwidth used by the first wireless network and the second precedence metric comprises an amount of bandwidth used by the second wireless network;

a fourth circuit configured to release at least a portion of the first set of channels based on the determination; and a fifth circuit configured to use a remaining portion of the first set of channels for communicating in the first wireless network.

6. The apparatus of claim 5, wherein the first wireless network uses a higher channel bandwidth than the second wireless network.

7. The apparatus of claim 5, wherein the third circuit is configured to release the at least the portion of the first set of channels by releasing one or more secondary channels from the first set of channels.

8. An apparatus for wireless communications, comprising:

a first circuit configured to use a first set of channels for communicating in a first wireless network;

a second circuit configured to receive an intolerance indication from a second wireless network;

a third circuit configured to determine, in response to receiving the intolerance indication, whether to comply with the intolerance indication based on a first precedence metric of the first wireless network and a second precedence metric of the second wireless network, wherein the third circuit is configured to determine whether to comply with the intolerance indication by comparing the first precedence metric to the second precedence metric, and wherein the first precedence metric comprises at least one of a type or quality of service requirement of traffic in the first wireless network and the second precedence metric comprises at least one of a type or quality of service requirement of traffic in the second wireless network;

a fourth circuit configured to release at least a portion of the first set of channels based on the determination; and a fifth circuit configured to use a remaining portion of the first set of channels for communicating in the first wireless network.

9. An apparatus for wireless communications, comprising:

means for using a first set of channels for communicating in a first wireless network;

means for receiving an intolerance indication from a second wireless network;

means for determining, in response to receiving the intolerance indication, whether to comply with the intolerance indication based on a first precedence metric of the first wireless network and a second precedence metric of the second wireless network, wherein the means for determining are configured to determine whether to comply with the intolerance indication by comparing the first precedence metric to the second precedence metric, and wherein the first precedence metric comprises an amount of bandwidth used by the first wireless network and the second precedence metric comprises an amount of bandwidth used by the second wireless network;

means for releasing at least a portion of the first set of channels based on the determination; and means for using a remaining portion of the first set of channels for communicating in the first wireless network.

10. The apparatus of claim 9, wherein the first wireless network uses a higher channel bandwidth than the second wireless network.

11. The apparatus of claim 9, wherein the means for releasing the at least the portion of the first set of channels is configured to release one or more secondary channels from the first set of channels.

12. An apparatus for wireless communications, comprising:

means for using a first set of channels for communicating in a first wireless network;

means for receiving an intolerance indication from a second wireless network;

means for determining, in response to receiving the intolerance indication, whether to comply with the intolerance indication based on a first precedence metric of the first wireless network and a second precedence metric of the second wireless network, wherein the means for determining are configured to determine whether to comply with the intolerance indication by comparing the first precedence metric to the second precedence metric, and wherein the first precedence metric comprises at least one of a type or quality of service requirement of traffic in the first wireless network and the second precedence metric comprises at least one of a type or quality of service requirement of traffic in the second wireless network;

means for releasing at least a portion of the first set of channels based on the determination; and means for using a remaining portion of the first set of channels for communicating in the first wireless network.

13. A non-transitory computer-readable medium comprising instructions executable to:

use a first set of channels for communicating in a first wireless network;

receive an intolerance indication from a second wireless network;

determine, in response to receiving the intolerance indication, whether to comply with the intolerance indication based on a first precedence metric of the first wireless network and a second precedence metric of the second wireless network wherein determining whether to comply with the intolerance indication comprises comparing the first precedence metric to the second precedence metric, and wherein the first precedence metric comprises an amount of bandwidth used by the first wireless network and the second precedence metric comprises an amount of bandwidth used by the second wireless network;

release at least a portion of the first set of channels based on the precedence determination; and use a remaining portion of the first set of channels for communicating in the first wireless network.

14. An access point, comprising:

at least one antenna;

a first circuit configured to use a first set of channels for communicating in a first wireless network;

a second circuit configured to receive, via the at least one antenna, an intolerance indication from a second wireless network;

a third circuit configured to determine, in response to receiving the intolerance indication, whether to comply with the intolerance indication based on a first precedence metric of the first wireless network and a second precedence metric of the second wireless network, wherein the third circuit is configured to determine whether to comply with the intolerance indication by comparing the first precedence metric to the second precedence metric, and wherein first precedence metric comprises an amount of bandwidth used by the first wireless network and the second precedence metric comprises an amount of bandwidth used by the second wireless network;

a fourth circuit configured to release at least a portion of the first set of channels based on the determination; and a fifth circuit configured to use a remaining portion of the first set of channels for communicating in the first wireless network.

15. A method for wireless communications, comprising:

using a first set of channels for communicating in a first wireless network;

receiving an intolerance indication from a second wireless network, wherein the second wireless network uses a lower channel bandwidth than the first wireless network;

in response to the intolerance indication, using one or more channels from the first set of channels for communicating in the first wireless network using a first set of access parameters depending on the intolerance indication; and using a remaining subset of the first set of channels for communicating in the first wireless network using a second set of access parameters depending on the intolerance indication.

16. The method of claim 15, wherein the first and second sets of access parameters comprise at least one of a contention window value or an allowed access category.

17. The method of claim 15, wherein the first wireless network comprises an 80 MHz network and the second wireless network comprises a 40 MHz network.

18. The method of claim 15, wherein the first wireless network comprises a 160 MHz network and the second wireless network comprises a 40 MHz network.

19. An apparatus for wireless communications, comprising:

a first circuit configured to use a first set of channels for communicating in a first wireless network;

a second circuit configured to receive an intolerance indication from a second wireless network, wherein the second wireless network uses a lower channel bandwidth than the first wireless network;

a third circuit configured to use one or more channels from the first set of channels for communicating in the first wireless network using a first set of access parameters depending on the intolerance indication, in response to the intolerance indication; and a fourth circuit configured to use a remaining subset of the first set of channels for communicating in the first wireless network using a second set of access parameters depending on the intolerance indication.

20. The apparatus of claim 19, wherein the first and second sets of access parameters comprise at least one of a contention window value or an allowed access category.

21. The apparatus of claim 19, wherein the first wireless network comprises an 80 MHz network and the second wireless network comprises a 40 MHz network.

22. The apparatus of claim 19, wherein the first wireless network comprises a 160 MHz network and the second wireless network comprises a 40 MHz network.

23. An apparatus for wireless communications, comprising:

means for using a first set of channels for communicating in a first wireless network;

means for receiving an intolerance indication from a second wireless network, wherein the second wireless network uses a lower channel bandwidth than the first wireless network;

means for using one or more channels from the first set of channels for communicating in the first wireless network using a first set of access parameters depending on the intolerance indication, in response to the intolerance indication; and means for using a remaining subset of the first set of channels for communicating in the first wireless network using a second set of access parameters depending on the intolerance indication.

24. The apparatus of claim 23, wherein the first and second sets of access parameters comprise at least one of a contention window value or an allowed access category.

25. The apparatus of claim 23, wherein the first wireless network comprises an 80 MHz network and the second wireless network comprises a 40 MHz network.

26. The apparatus of claim 23, wherein the first wireless network comprises a 160 MHz network and the second wireless network comprises a 40 MHz network.

27. A non-transitory computer-readable medium comprising instructions executable to:
- use a first set of channels for communicating in a first wireless network;
- receive an intolerance indication from a second wireless network, wherein the second wireless network uses a lower channel bandwidth than the first wireless network;
- use one or more channels from the first set of channels for communicating in the first wireless network using a first set of access parameters depending on the intolerance indication, in response to the intolerance indication; and
- use a remaining subset of the first set of channels for communicating in the first wireless network using a second set of access parameters depending on the intolerance indication.

28. An access point, comprising:
- at least one antenna;
- a first circuit configured to use a first set of channels for communicating in a first wireless network;
- a second circuit configured to receive, via the at least one antenna, an intolerance indication from a second wireless network, wherein the second wireless network uses a lower channel bandwidth than the first wireless network;
- a third circuit configured to use one or more channels from the first set of channels for communicating in the first wireless network using a first set of access parameters depending on the intolerance indication, in response to the intolerance indication; and
- a fourth circuit configured to use a remaining subset of the first set of channels for communicating in the first wireless network using second set of access parameters depending on the intolerance indication.

29. A non-transitory computer-readable medium comprising instructions executable to:
- use a first set of channels for communicating in a first wireless network;
- receive an intolerance indication from a second wireless network;
- determine, in response to receiving the intolerance indication, whether to comply with the intolerance indication based on a first precedence metric of the first wireless network and a second precedence metric of the second wireless network, wherein determining whether to comply with the intolerance indication comprises comparing the first precedence metric to the second precedence metric, and wherein the first precedence metric comprises at least one of a type or quality of service requirement of traffic in the first wireless network and the second precedence metric comprises at least one of a type or quality of service requirement of traffic in the second wireless network;
- release at least a portion of the first set of channels based on the precedence determination; and
- use a remaining portion of the first set of channels for communicating in the first wireless network.

30. An access point, comprising:
- at least one antenna;
- a first circuit configured to use a first set of channels for communicating in a first wireless network;
- a second circuit configured to receive, via the at least one antenna, an intolerance indication from a second wireless network;
- a third circuit configured to determine, in response to receiving the intolerance indication, whether to comply with the intolerance indication based on a first precedence metric of the first wireless network and a second precedence metric of the second wireless network, wherein the third circuit is configured to determine whether to comply with the intolerance indication by comparing the first precedence metric to the second precedence metric, and wherein the first precedence metric comprises at least one of a type or quality of service requirement of traffic in the first wireless network and the second precedence metric comprises at least one of a type or quality of service requirement of traffic in the second wireless network;
- a fourth circuit configured to release at least a portion of the first set of channels based on the determination; and
- a fifth circuit configured to use a remaining portion of the first set of channels for communicating in the first wireless network.

* * * * *